United States Patent
Fujdala et al.

(10) Patent No.: US 9,490,480 B2
(45) Date of Patent: Nov. 8, 2016

(54) MOLECULAR PRECURSORS FOR LITHIUM-IRON-CONTAINING CATHODE MATERIALS

(71) Applicant: Transtron Solutions LLC, San Jose, CA (US)

(72) Inventors: Kyle L. Fujdala, San Jose, CA (US); Zhongliang Zhu, San Jose, CA (US); Paul R. Markoff Johnson, Sunnyvale, CA (US)

(73) Assignee: Transtron Solutions LLC, San Jose, CA (US)

( * ) Notice: Subject to any disclaimer, the term of this patent is extended or adjusted under 35 U.S.C. 154(b) by 613 days.

(21) Appl. No.: 13/929,673

(22) Filed: Jun. 27, 2013

(65) Prior Publication Data

US 2014/0011086 A1  Jan. 9, 2014

Related U.S. Application Data

(60) Provisional application No. 61/665,273, filed on Jun. 27, 2012.

(51) Int. Cl.

| | |
|---|---|
| *H01M 4/525* | (2010.01) |
| *C01B 25/45* | (2006.01) |
| *C01B 33/32* | (2006.01) |
| *C01D 15/02* | (2006.01) |
| *H01M 4/58* | (2010.01) |
| *H01M 4/505* | (2010.01) |
| *H01M 4/02* | (2006.01) |
| *C09D 11/30* | (2014.01) |
| *C09D 11/38* | (2014.01) |

(52) U.S. Cl.
CPC .............. *H01M 4/505* (2013.01); *C01B 25/45* (2013.01); *C01B 33/32* (2013.01); *C01D 15/02* (2013.01); *C09D 11/30* (2013.01); *C09D 11/38* (2013.01); *H01M 4/02* (2013.01); *H01M 4/525* (2013.01); *H01M 4/5825* (2013.01)

(58) Field of Classification Search
CPC .................................................... H01M 4/5825
See application file for complete search history.

(56) References Cited

U.S. PATENT DOCUMENTS

| | | |
|---|---|---|
| 5,601,952 A | 2/1997 | Dasgupta |
| 2001/0031397 A1 | 10/2001 | Kweon |

FOREIGN PATENT DOCUMENTS

| | | |
|---|---|---|
| EP | 1035600 A1 | 9/2000 |
| EP | 1136446 A2 | 9/2001 |

OTHER PUBLICATIONS

Ottley, ACS National Meeting, Abstract INOR 183, dated Jan. 26, 2009, Novel iron (II/III) and lithium iron alkoxide precursors for lithium ion battery cathode materials.

(Continued)

*Primary Examiner* — Barbara Gilliam
*Assistant Examiner* — Stephan Essex
(74) *Attorney, Agent, or Firm* — Eckman Basu LLP

(57) ABSTRACT

Lithium-iron molecular precursor compounds, compositions and processes for making a cathode for lithium ion batteries. The molecular precursor compounds are soluble and provide processes to make stoichiometric cathode materials with solution-based processes. The cathode material can be, for example, a lithium iron oxide, a lithium iron phosphate, or a lithium iron silicate. Cathodes can be made as bulk material in a solid form or in solution, or in various forms including thin films.

11 Claims, 5 Drawing Sheets

(56) References Cited

OTHER PUBLICATIONS

Shah, Synth React Inorg Met-Org Chem, 1991, vol. 21(4), pp. 609-621.
Caulton, 1990, Chem Rev, pp. 969-995.
Veith, 1998, Polyhedron, vol. 17(5-6), pp. 1005-1034.
Vaarstra, 1990, J Chem Soc Chem Commun, pp. 1750-1751.
Vaarstra, 1991, Inorg Chem, vol. 30, pp. 3068-3072.
Gupta, 1991, Indian Journal of Chemistry, vol. 50A, pp. 592-595.
Knabe, 2011, Phys Status Solidi A, vol. 208(4), pp. 857-862.
Barley, 2005, Acta Cryst, vol. C61, pp. m346-m347.
Olmstead, 1986, Inorg Chem, vol. 25, pp. 1027-1033.
Noguchi, 1993, Denki Kagaku, vol. 61(7), pp. 720-721.
Boyle, 2003, Chem Mater, vol. 15, pp. 3903-3912.
Murray, 1984, J Am Chem Soc, vol. 106, pp. 7011-7015.

MOLECULAR PRECURSORS FOR LITHIUM-IRON-CONTAINING CATHODE MATERIALS

BACKGROUND

The choice of cathode for a battery is significant in terms of the desired performance and cost. The cathode composition is an important factor for the energy density that can be achieved. For lithium-ion batteries, the choice of cathode can also involve a balance between power available and energy utilization. Thus, the choice of cathode is important for the planned mode of application of the battery.

Useful candidates for cathode materials for lithium-ion batteries include lithium iron oxides, lithium iron phosphates, and lithium iron silicates.

A drawback in the field of lithium-ion batteries is the difficulty of synthesizing cathode material at moderate temperatures. Use of moderate temperatures is desirable for efficiency, but has been a drawback because it limits the choice of cathode material that can be synthesized.

It is also desirable to provide cathode materials with a high degree of compositional homogeneity and control, as well as uniformity and purity. Conventional methods may require temperatures as high as 1000° C.

Another problem is to provide cathode material having long term stability under various battery operating conditions.

A further drawback is that the properties desired for the battery, such as energy density, lifecycle, and stability can require cathode materials of high compositional uniformity.

These requirements can place a high value and strict conditions on processes for synthesizing cathode materials.

In addition to bulk materials for cathodes, various architectures for making a lithium ion battery may require thin film cathodes. For example, a cathode can be formed as a thin film in a pattern to be interspersed or interleaved with electrolyte and anode components. The cathode itself can be composed of multiple thin film layers. The difficulties with these approaches include controlling the uniformity, purity and homogeneity of the cathode layers, as well as controlling cathode surface and edge quality.

Difficulties in the production of thin film cathodes include limited ability to deposit uniform layers of cathode material with sufficient speed and throughput for commercial processes.

There has long been a continuing need for processes for synthesizing cathode materials for lithium ion batteries at moderate temperatures to provide materials having a high degree of compositional homogeneity, uniformity and purity.

There is also a need for processes for making cathode materials that provide control over the composition and stoichiometry of the materials.

What is needed are soluble precursor compounds and compositions for processes for synthesizing cathode materials for lithium ion batteries.

BRIEF SUMMARY

This invention relates to molecular precursor compounds, compositions and processes used to prepare cathode materials for lithium ion battery devices. In particular, this invention relates to molecular precursor compounds, compositions and processes for making bulk cathode materials, and cathodes in various forms including thin films.

This invention encompasses a range of molecular precursor compounds, compositions and processes used to prepare cathode materials for lithium ion battery devices. The cathode materials can be bulk cathode materials, and cathodes in various forms including thin films.

Embodiments of this disclosure include:

A molecular precursor compound having the empirical formula [LiFe(OR)$_3$]. wherein each of the —OR groups is independently selected from alkoxy, aryloxy, heteroaryloxy, alkenyloxy, siloxy, phosphinate, phosphonate, and phosphate.

The molecular precursor compound above, wherein the alkoxy groups are selected from methoxy, ethoxy, n-propoxy, 1-methylethoxy, butoxy, 1-methylpropoxy, 2-methylpropoxy or 1,1-dimethylethoxy, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy, heptyloxy, octyloxy, 2-ethylhexyloxy, nonyloxy, decyloxy, aminoalkoxy —ORNR$_2$ where R is alkyl, alkoxyalkoxy-OROR where R is alkyl, phosphatoalkoxy —ORPR$_2$ where R is alkyl, and positional isomers and combinations thereof;

wherein the dialkoxy groups are —OR$^2$O— groups, wherein R$^2$ may be a substituted or unsubstituted, branched or unbranched alkylene chain —(CH$_2$)$_q$—, where q is from 1 to 20;

wherein the siloxy groups are selected from —OSi(OR$^1$)$_3$, —OSi(OR$^1$)$_2$R$^2$, —OSi(OR$^1$)R$^2{}_2$, and —OSiR$^2{}_3$, wherein R$^1$ and R$^2$ are independently, for each occurrence, selected from alkyl, aryl, heteroaryl, alkenyl, silyl, and positional isomers and combinations thereof; and wherein the phosphate groups are —OP(O)(OR$^1$)$_2$, the phosphonate groups are —OP(O)(OR$^1$)R$^2$, and the phosphinate groups are —OP(O)R$^2{}_2$, wherein R$^1$ and R$^2$ are independently, for each occurrence, selected from alkyl, aryl, heteroaryl, alkenyl, and silyl.

A molecular precursor compound having the empirical formula [LiFe(OR)$_4$], wherein the —OR groups are independently, for each occurrence, selected from alkoxy, aryloxy, heteroaryloxy, alkenyloxy, siloxy, phosphinate, phosphonate, and phosphate.

The molecular precursor compound above, wherein the alkoxy groups are selected from methoxy, ethoxy, n-propoxy, 1-methylethoxy, butoxy, 1-methylpropoxy, 2-methylpropoxy or 1,1-dimethylethoxy, pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy, heptyloxy, octyloxy, 2-ethylhexyloxy, nonyloxy, decyloxy, aminoalkoxy-ORNR$_2$ where R is alkyl, alkoxyalkoxy-OROR where R is alkyl, phosphatoalkoxy-ORPR$_2$ where R is alkyl, and positional isomers and combinations thereof;

wherein the dialkoxy groups are —OR²O— groups, wherein R² may be a substituted or unsubstituted, branched or unbranched alkylene chain —(CH$_2$)$_q$—, where q is from 1 to 20;

wherein the siloxy groups are selected from —OSi(OR$^1$)$_3$, —OSi(OR$^1$)$_2$R$^2$, —OSi(OR$^1$)R$^2$$_2$, and —OSiR$^2$$_3$, wherein R$^1$ and R$^2$ are independently, for each occurrence, selected from alkyl, aryl, heteroaryl, alkenyl, silyl, and positional isomers and combinations thereof; and wherein the phosphate groups are —OP(O)(OR$^1$)$_2$, the phosphonate groups are —OP(O)(OR$^1$)R$^2$, and the phosphinate groups are —OP(O)R$^2$$_2$, wherein R$^1$ and R$^2$ are independently, for each occurrence, selected from alkyl, aryl, heteroaryl, alkenyl, and silyl.

A molecular precursor compound having the empirical formula Li$_2$Fe$^{x+}$(OR)$_{2+x}$, wherein x is selected from 2 and 3, and the —OR groups are independently selected from alkoxy, aryloxy, heteroaryloxy, alkenyloxy, siloxy, phosphinate, phosphonate, and phosphate.

A process for making a cathode material, the process comprising: providing one or more molecular precursor compounds according to any one of the compounds above, or a mixture thereof; and heating the mixture at a temperature of from 100° C. to 800° C. to convert it to a material.

The process above, wherein the heating is performed with exposure to air or oxidizing atmosphere, or wherein the heating is performed under inert atmosphere after exposure to air or oxidizing atmosphere.

The process above, wherein the mixture is a mixture of solids, or the mixture is in a solution.

The process above, further comprising annealing the material at a temperature of from 400° C. to 800° C.

The process above, wherein the mixture contains one or more dopant source compounds having the formula M(OR)$_q$, where M is selected from Mg, Y, Ti, Zr, Nb, Cr, Ru, B, Al, Bi, Sb, Sn, La, q is the same as the oxidation state of the atom M, and (OR) is selected from alkoxy, aryloxy, heteroaryloxy, alkenyloxy, siloxy, phosphinate, phosphonate, and phosphate.

A process for making a thin film cathode, the process comprising: providing a substrate coated with a current collector layer; providing an ink comprising one or more molecular precursor compounds above; and depositing the ink onto the current collector layer; heating the deposited ink at a temperature of from 100° C. to 800° C. to convert it to a material.

The process above, wherein the heating is performed with exposure to air or oxidizing atmosphere.

The process above, wherein the heating is performed under inert atmosphere after exposure to air or oxidizing atmosphere.

The process above, further comprising annealing the material at a temperature of from 400° C. to 800° C.

The process above, wherein the ink contains one or more dopant source compounds having the formula M(OR)$_q$, where M is selected from Mg, Y, Ti, Zr, Nb, Cr, Ru, B, Al, Bi, Sb, Sn, La, q is the same as the oxidation state of the atom M, and (OR) is selected from alkoxy, aryloxy, heteroaryloxy, alkenyloxy, siloxy, phosphinate, phosphonate, and phosphate.

A process for making a precursor compound, the process comprising reacting Fe(NR$^1$$_2$)$_2$ or Fe(NR$^1$$_2$)$_3$ with R$^2$OH and LiOR$^2$ in a solvent; wherein R$^1$ is alkyl, aryl, heteroaryl, or alkenyl, and the —OR$^2$ groups are independently selected, for each occurrence, from alkoxy, aryloxy, heteroaryloxy, alkenyloxy, siloxy, phosphinate, phosphonate, and phosphate; and wherein the R$^2$OH is selected from ethanol, isopropanol, sec-butanol, n-butanol, t-butanol, HOSi(OR$^3$)$_3$, HOSi(OR$^3$)$_2$R$^4$, HOSi(OR$^3$)R$^4$$_2$, HOSiR$^4$$_3$, and a diol HOR$^2$OH, wherein R$^3$ and R$^4$ are independently selected from alkyl, aryl, heteroaryl, or alkenyl.

A process for making a precursor compound, the process comprising reacting Fe(NR$^1$$_2$)$_2$ or Fe(NR$^1$$_2$)$_3$ with R$^2$OH and LiNR$^1$$_2$ in a solvent; wherein R$^1$ is alkyl, aryl, heteroaryl, or alkenyl, and the —OR$^2$ groups are independently selected, for each occurrence, from alkoxy, aryloxy, heteroaryloxy, alkenyloxy, siloxy, phosphinate, phosphonate, and phosphate; and wherein R$^1$ is Si(CH$_3$)$_3$ and R$^2$OH is selected from ethanol, isopropanol, sec-butanol, n-butanol, t-butanol, HOSi(OR$^3$)$_3$, HOSi(OR$^3$)$_2$R$^4$, HOSi(OR$^3$)R$^4$$_2$, HOSiR$^4$$_3$, and a diol HOR$^2$OH, wherein R$^3$ and R$^4$ are independently selected from alkyl, aryl, heteroaryl, and alkenyl.

A process for making a precursor compound, the process comprising reacting Fe(OR)$_2$ or Fe(OR)$_3$ with LiOR in a solvent, wherein the —OR groups are independently selected, for each occurrence, from alkoxy, aryloxy, heteroaryloxy, alkenyloxy, siloxy, phosphinate, phosphonate, and phosphate.

A process for making an ink, the process comprising: providing a molecular precursor compound above; and dissolving the compound in an acetate-solvent mixture comprising an acetate ink component; wherein the acetate ink component is selected from alkyl acetates, ethyl acetate, propyl acetates, butyl acetates, n-butyl acetate, sec-butyl acetate, tert-butyl acetate, hexyl acetates, aryl acetates, alkenyl acetates, and heteroaryl acetates; and wherein the solvent is selected from alcohol, methanol, ethanol, isopropyl alcohol, sec-butanol, thiols, butanol, butanediol, glycerols, alkoxyalcohols, glycols, 1-methoxy-2-propanol, acetone, ethylene glycol, propylene glycol, propylene glycol laurate, ethylene glycol ethers, diethylene glycol, triethylene glycol monobutylether, propylene glycol monomethylether, 1,2-hexanediol, ethers, diethyl ether, aliphatic hydrocarbons, aromatic hydrocarbons, dodecane, hexadecane, pentane, hexane, heptane, octane, isooctane, decane, cyclohexane, p-xylene, m-xylene, o-xylene, benzene, toluene, xylene, tetrahydrofuran, 2-methyltetrahydrofuran, siloxanes, cyclosiloxanes, silicone fluids, halogenated hydrocarbons, dibromomethane, dichloromethane, dichloroethane, trichloroethane chloroform, methylene chloride, acetonitrile, esters, acrylates, isobornyl acrylate, 1,6-hexanediol diacrylate, polyethylene glycol diacrylate, ketones, methyl ethyl ketone, cyclohexanone, butyl carbitol, cyclopentanone, lactams, N-methylpyrrolidone, N-(2-hydroxyethyl)-pyrrolidone, cyclic acetals, cyclic ketals, aldehydes, amines, diamines, amides, dimethylformamide, methyl lactate, oils, natural oils, terpenes, and mixtures thereof.

A cathode material having the formula Li$_{(1+x)}$FeO$_{(2+x/2)}$, where x is from 0.01 to 1.

A cathode material having the formula Li$_{(1+x)}$Fe(PO$_{(4+x/2)}$), where x is from 0.01 to 1.

A cathode material having the formula Li$_{(z+x)}$Fe(SiO$_{(4+x/2)}$), where x is from 0.01 to 1.

Embodiments include a cathode made by the processes above, and a lithium ion battery made with the cathode.

BRIEF DESCRIPTION OF THE DRAWINGS

FIG. 2 shows that the soluble molecular precursor compounds can be used to form a solution. The molecular precursor compounds in the solution can be converted into a material. The material in the solution can be used as a slurry, or the material can be isolated from the solution. A final cathode material may be made by annealing. The final cathode material is used in a lithium ion battery.

FIG. 3 shows that the molecular precursor compounds can be used in solid form. The molecular precursor compounds can be converted into a material. The material can be transformed into a final cathode material by annealing. The final cathode material is used in a lithium ion battery.

FIG. 4 shows that the molecular precursor compounds can be used to form an ink composition. The ink composition can be deposited onto a substrate by printing or spraying, and the molecular precursor compounds transformed into a cathode material. The final cathode material is used in a lithium ion battery.

DETAILED DESCRIPTION

Figure 1:
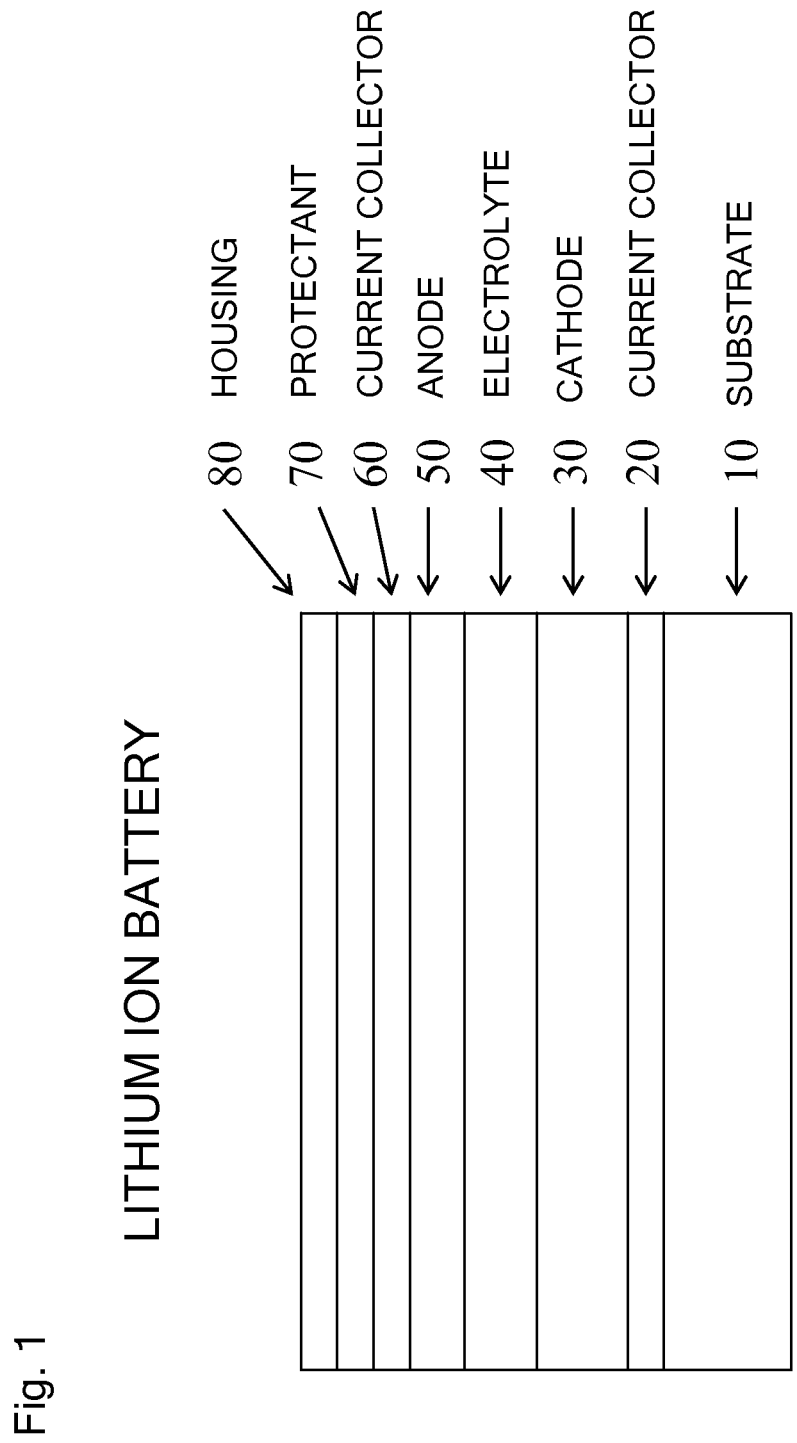
FIG. 1: Schematic representation of a lithium ion battery embodiment of this invention.

This disclosure provides compounds, compositions and processes for making cathode materials. In one aspect, this disclosure provides processes to make cathode materials using soluble molecular precursor compounds. The molecular precursor compounds can be converted to high quality cathode materials. Thus, this invention provides molecular precursor compounds that can be used for facile synthesis of cathode materials.

Molecular precursor compounds of this disclosure have been designed and synthesized for efficient processes to make cathodes. A molecular precursor compound of this disclosure may be soluble in a solvent or solvent mixture, or in a solvent containing an acetate component, or in an organic solvent.

The molecular precursor compounds of this disclosure are soluble in certain solvents and provide new ways to make stoichiometric cathode materials with solution-based processes. The final cathodes can be, for example, a lithium iron oxide, a lithium iron phosphate, or a lithium iron silicate.

Molecular precursor compounds and compositions of this invention can advantageously be used to make homogeneous cathode materials at moderate temperatures, and for synthesis of cathode materials with controlled stoichiometry.

The molecular precursor compounds of this invention can be used to make bulk material for cathodes in different formats for various battery applications.

The molecular precursor compounds of this invention can also be used to make cathodes as thin films. Thin films can be made by depositing molecular precursor compounds onto a substrate and transforming the deposited layer into a cathode material.

Synthesis of Bulk Cathode Materials

Lithium ion batteries can be made using bulk cathode materials.

This disclosure provides a range of isolated molecular precursor compounds which can be used in solid form, or can be solubilized for preparing cathode materials. The isolated molecular precursor compounds of this invention can overcome the drawbacks of attempting to use cathode compounds themselves for making cathodes.

The isolated molecular precursor compounds of this invention can have unexpectedly advantageous solubility and properties for making cathode materials.

The isolated molecular precursor compounds of this invention can advantageously allow control of the stoichiometry of lithium and transition metal atoms.

Cathodes Prepared from Solids:

In some aspects, this invention provides processes for making bulk cathode materials by converting a solid form of a molecular precursor compound into a bulk material. The molecular precursor compound can be used as a neat solid to be converted to a cathode material.

Cathodes Prepared from Solutions:

In certain aspects, this invention provides processes for making cathode materials by dissolving a molecular precursor compound in a solvent to form a solution, and converting the dissolved molecular precursor compound into a bulk material. The solution of the molecular precursor compound may contain a catalyst such as a Lewis acid catalyst or Bronsted acid catalyst.

In some embodiments, the final liquor containing the bulk material that was produced can be used as a slurry to prepare a cathode coating for use in battery production. In certain embodiments, the bulk material can be isolated from the final liquor for additional processing.

The step of converting a molecular precursor compound into a cathode material, whether performed with neat solids or in solution, can be done by thermal treatment. In some embodiments, a molecular precursor compound can be converted into a material by the application of heat, light, kinetic, mechanical or other energy, or for example, UV light or microwave irradiation.

Embodiments of this invention advantageously provide processes for making cathode materials at moderate temperatures.

The step of converting a molecular precursor compound into a material can be performed at a temperature of about 300° C. to about 500° C.

The step of converting a molecular precursor compound into a material can be performed at various temperatures including from about 100° C. to about 800° C., or from about 150° C. to about 800° C., or from about 200° C. to about 800° C., or from about 300° C. to about 800° C., or from about 400° C. to about 800° C., or from about 400° C. to about 700° C., or from about 400° C. to about 600° C., or from about 450° C. to about 650° C., or from about 450° C. to about 600° C., or from about 550° C. to about 650° C.

In some embodiments, a step of converting a molecular precursor compound into a material, whether performed with neat solids or in solution, can be done with exposure to ambient air, or dry air, or air with controlled humidity.

In some embodiments, a step of converting a molecular precursor compound into a material, whether performed with neat solids or in solution, can be done in an inert atmosphere.

In certain embodiments, a step of converting a molecular precursor compound into a material, whether performed with neat solids or in solution, can be done in an inert atmosphere after exposure of the molecular precursor compound to ambient air, or dry air, or air with controlled humidity.

In certain aspects, a step of converting a molecular precursor compound into a material, whether performed with neat solids or in solution, can be done under oxidizing conditions or with exposure to an oxidizing atmosphere. Examples of an oxidizing atmosphere include 1% $O_2$/99% $N_2$, 10% $O_2$/90% $N_2$, and air.

In certain aspects, a step of converting a mixture of molecular precursor compounds into a material, whether performed with neat solids or in solution, can be done under reducing conditions. Examples of a reducing atmosphere include 1% $H_2$/99% $N_2$, and 5% $H_2$/95% $N_2$.

Processes for Final Cathode Materials

In further aspects, processes for making a cathode for a lithium ion battery can include a step of converting a molecular precursor compound, or composition thereof, into a material or pre-cathode material, followed by a step of transforming the material into a final product cathode material.

A step of converting a material or pre-cathode material into a final cathode material can be performed by thermal treatment.

In some embodiments, a cathode material or pre-cathode material can be transformed into a final cathode material by annealing.

A step of annealing a cathode material or pre-cathode material can be performed under oxidizing conditions.

A step of annealing a cathode material or pre-cathode material can be performed under dry air.

An annealing process may include a step of heating a material at a temperature sufficient to transform the material into a final cathode material, which may include growth of crystalline grains.

An annealing process may include a step of heating at a temperature of from 400° C. to 800° C. for a time period of from 1 min to 60 min. In some embodiments, an annealing process includes a step of heating a substrate at a temperature of 400° C., or 450° C., or 500° C., or 600° C., or 650° C.

An annealing process may include a step of rapid thermal processing. In some embodiments, rapid thermal processing may be performed by heating at a rate from 1°/s to 100°/s.

Cathodes as Thin Films

In some aspects, one or more molecular precursor compounds of this disclosure may be combined to provide an ink composition. The properties of an ink composition may be controlled through the nature of the molecular precursor compounds and the ink components.

In certain aspects, a cathode may be fabricated by first depositing one or more layers of a molecular precursor ink. An ink composition of this invention can achieve high throughput for deposition by printing or spraying processes.

Cathodes Prepared with Ink Compositions:

A cathode may be prepared in various embodiments by converting the molecular precursor compounds in a deposited ink into a cathode or pre-cathode material. The cathode or pre-cathode material may be finished by further annealing. In some embodiments, the cathode or pre-cathode material may be finished by depositing additional layers of ink and converting the molecular precursor compounds therein to a material.

In some embodiments, a step of converting a molecular precursor compound into a thin film material can be done with exposure to ambient air, or dry air, or air with controlled humidity.

In some embodiments, a step of converting a molecular precursor compound into a thin film material can be done in an inert atmosphere.

In certain embodiments, a step of converting a molecular precursor compound into a thin film material can be done in an inert atmosphere after exposure of the molecular precursor compound to ambient air, or dry air, or air with controlled humidity.

In certain aspects, a step of converting a molecular precursor compound into a thin film material can be done under oxidizing conditions or with exposure to an oxidizing atmosphere.

Molecular precursor compounds in various layers of ink deposited on a substrate can be converted to a cathode composition by applying energy to the layered substrate. In some embodiments, one or more molecular precursor compounds in a layer may be converted to a material before the deposition of a succeeding layer. In certain embodiments, one or more molecular precursor compounds in a group of layers can be converted at the same time.

Molecular precursor compounds in a layer may be converted to a material before, during or after the deposition of a different layer.

In further aspects, a lithium ion battery can be fabricated by depositing solid layers of a cathode, an electrolyte composition, and an anode. Each of the cathode and anode can have an associated current collector to provide electrical current output. The electrolyte composition or electrolyte portion of the battery may include a separator to isolate anode from cathode while allowing lithium ion transport to and from both the anode and cathode.

One way to produce lithium ion batteries involves depositing solid layers of a cathode, an electrolyte composition, and an anode, among other things. The layers can be deposited in two or three dimensions. A lithium ion battery can be composed of a solid cathode layer and a solid anode layer separated by a layer of an electrolyte composition that allows lithium ion transport to and from the anode and cathode.

Cathode layers could be made by printing, spraying, coating or other methods involving solutions or inks. Aspects of this invention can provide compounds and compositions to provide continuous transport of a solution or ink through an outlet, slot, die or print head. For example, inkjet printing can be performed with high throughput. Printing methods can be enhanced by using molecular precursor compounds of this invention that are soluble components of the ink.

Aspects of this invention may provide processes for depositing cathodes by printing, spraying, coating, inkjet or other methods involving solutions or inks of molecular precursor compounds. An ink can be deposited containing soluble cathode precursor compounds which can be transformed into a cathode material.

In general, this invention can provide stable ink forms which lack particulates and are suitable for efficient printing, spraying, or coating to make cathode materials.

Molecular Precursor Inks

Embodiments of this disclosure provide inks and ink compositions containing one or more molecular precursors.

In some aspects, inks and ink compositions may be made by dissolving or solubilizing molecular precursor molecules in one or more organic solvents.

In some embodiments, an ink for making cathode materials requires first providing one or more isolated molecular precursor compounds. The isolated molecular precursor compounds may be used to prepare an ink composition that can be efficiently printed or deposited on a substrate.

This disclosure provides a range of isolated molecular precursor compounds which can be solubilized for preparing an ink composition. The isolated molecular precursor compounds of this invention can overcome the drawbacks of attempting to use cathode compounds themselves for making thin film cathodes.

The isolated molecular precursor compounds of this invention can have unexpectedly advantageous solubility and properties for making an ink composition to be printed or deposited on a substrate.

The isolated molecular precursor compounds of this invention can advantageously allow control of the stoichiometry of metal atoms in an ink composition to be printed or deposited on a substrate.

In further aspects, inks and ink compositions may be made by directly synthesizing molecular precursor molecules in an ink composition.

In some embodiments, one or more molecular precursor compounds for making cathode materials can be prepared in-situ in an ink composition. The ink composition can be efficiently printed or deposited on a substrate.

Ink compositions having one or more molecular precursor compounds prepared in-situ during the ink forming process can advantageously provide a stable ink for efficient trouble-free use in printing, spraying, coating and other methods.

Ink compositions having one or more molecular precursor compounds prepared in-situ during the ink forming process can advantageously provide a stable ink for use in printing, spraying, coating and other methods.

Ink compositions of this invention having one or more molecular precursor compounds prepared in-situ during the ink forming process can advantageously allow control of the stoichiometry of lithium and transition metal atoms in an ink composition to be printed or deposited on a substrate.

Processes for Cathodes from Molecular Precursor Compounds

The depositing of inks and molecular precursors can be done by printing, spraying, coating, and other methods.

A schematic representation of a lithium ion battery embodiment of this invention is shown in FIG. 1.

Figure 2:
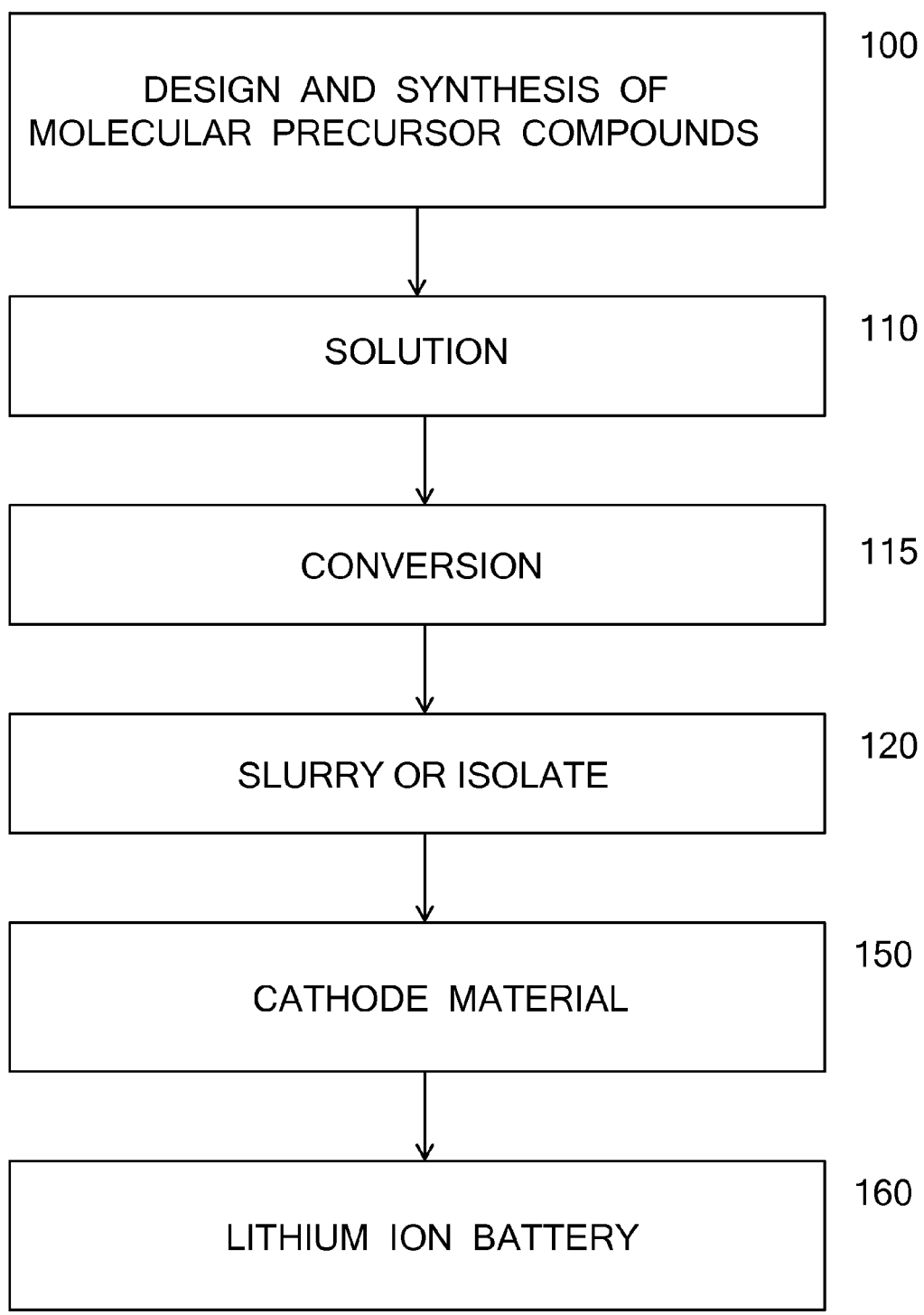
FIG. 2: Schematic representation of embodiments of this invention in which one or more molecular precursor compounds are designed and synthesized for use in making cathode materials.

As shown in FIG. 2, in certain embodiments, a bulk material can be made from molecular precursor compounds for use in making a cathode material. One or more molecular precursor compounds 100 can be solubilized in a solution 110. The molecular precursor compounds may be converted 115 into a material. The solution containing the material can be used as a slurry 120, or the material can be isolated from the solution. The slurry or isolated solid can be annealed to form a cathode material 150. A lithium ion battery 160 is fabricated with the cathode material.

Figure 3:
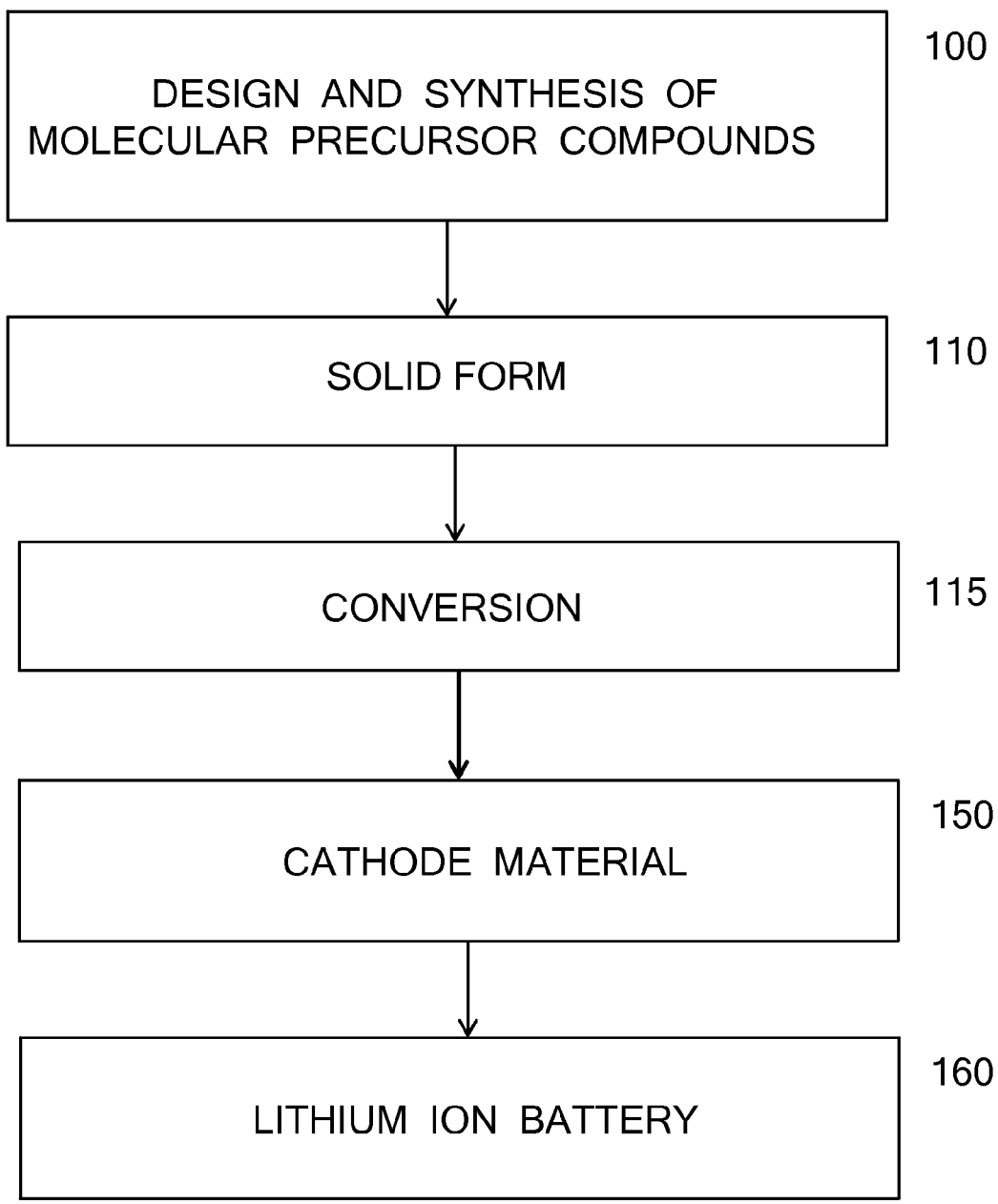
FIG. 3: Schematic representation of embodiments of this invention in which one or more molecular precursor compounds are designed and synthesized for use in making cathode materials.

As shown in FIG. 3, in certain embodiments, a bulk material can be made from molecular precursor compounds 100 in solid form 110 for use in making a cathode material. The molecular precursor compounds may be converted 115 into a material. The material can be transformed into a final cathode material 150. A lithium ion battery 160 is fabricated with the cathode material.

Figure 4:
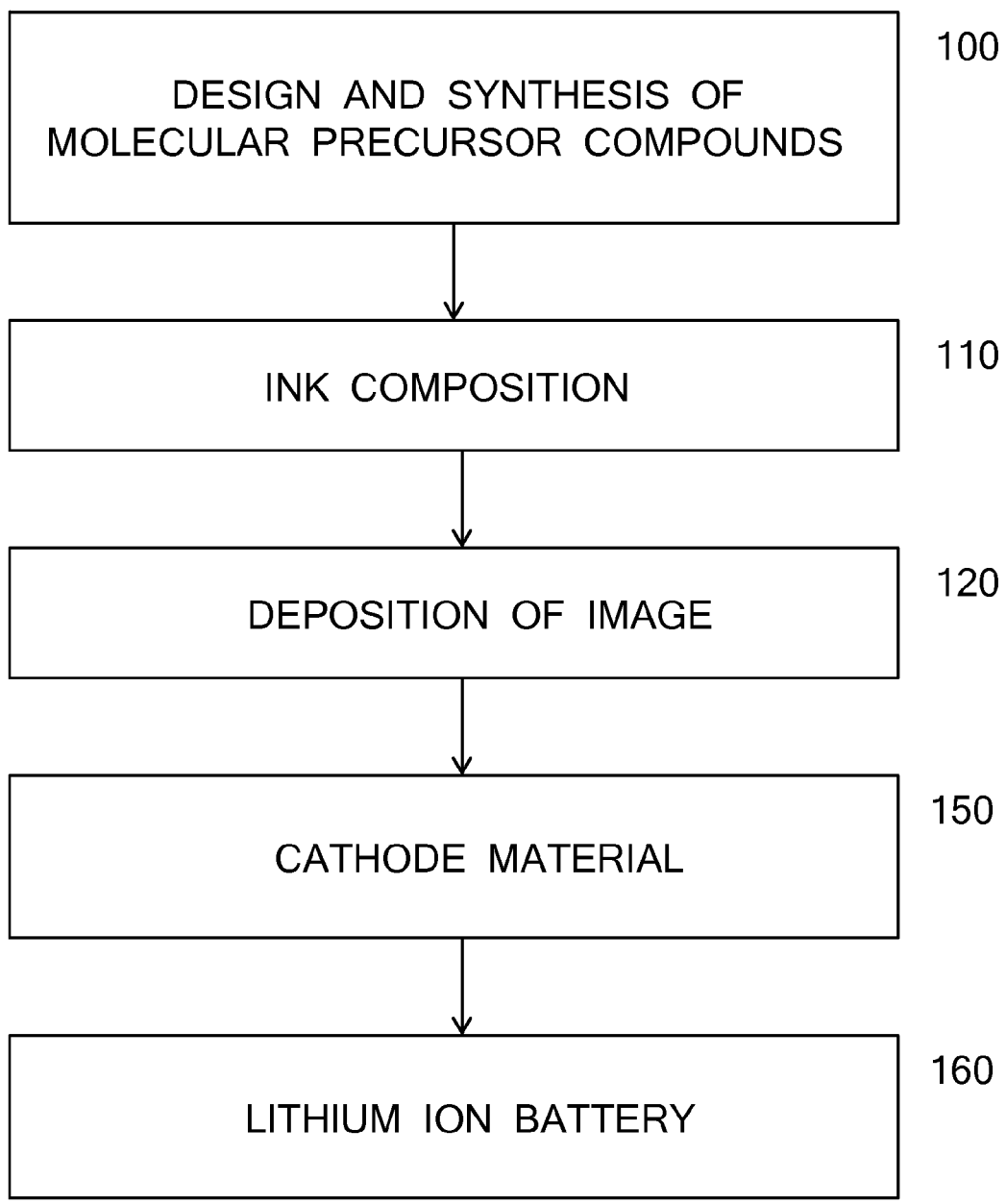
FIG. 4: Schematic representation of embodiments of this invention in which one or more molecular precursor compounds are designed and synthesized for cathodes.

As shown in FIG. 4, in certain embodiments, one or more molecular precursor compounds 100 can be solubilized in an ink composition 110 and deposited as an image 120 on a substrate. The molecular precursor compounds may be converted and/or annealed to form a cathode material 150. A lithium ion battery 160 can be fabricated with the cathode material.

Figure 5:
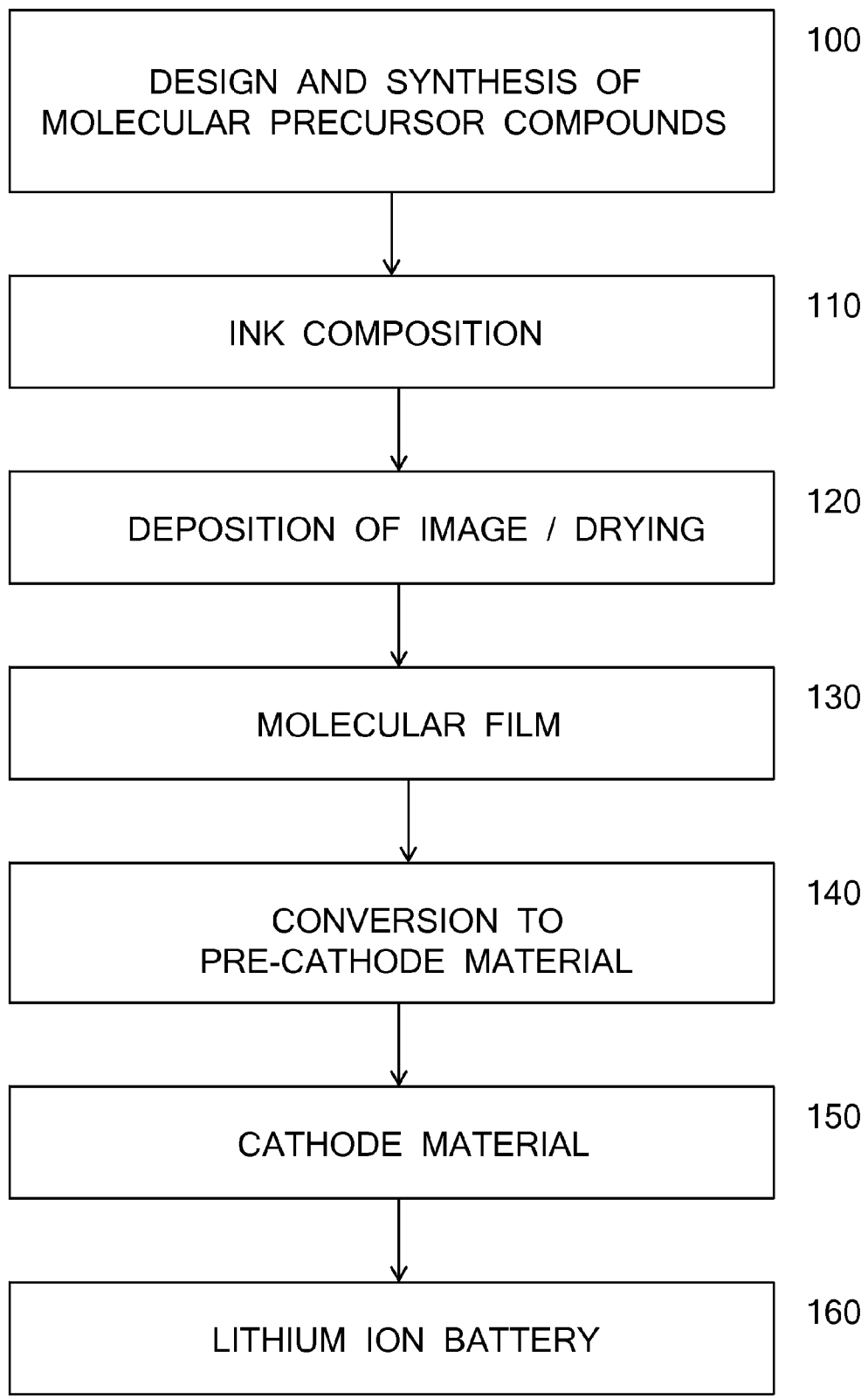
FIG. 5: Schematic representation of embodiments of this invention in which one or more molecular precursor compounds are prepared in-situ in an ink composition for making cathodes. The ink composition can be deposited onto a substrate by printing or spraying, and optionally dried in a drying stage to form a molecular precursor film. The molecular precursor compounds in the film may be converted and annealed to a cathode material. The final cathode material is used in a lithium ion battery.

As shown in FIG. 5, in certain embodiments, one or more molecular precursor compounds 100 can be solubilized in an ink composition 110 and deposited as an image 120 on a substrate. The molecular precursor compounds can be dried in a drying stage under drying conditions. The molecular precursor compounds can be transformed into a molecular film 130. The molecular precursor compounds can be further converted to form a pre-cathode material 140. The pre-cathode material 140 can be annealed to form a cathode material 150. A lithium ion battery 160 can be fabricated with the cathode material.

Each step of converting can optionally be done with exposure to ambient air, or dry air, or air with controlled humidity.

Each step of converting can be done in an inert atmosphere.

Each step of converting can also be done in an inert atmosphere after exposure to ambient air, or dry air, or air with controlled humidity.

Each step of converting can optionally be done under oxidizing conditions or with exposure to an oxidizing atmosphere.

A patterned layer or image on a substrate can be composed of multiple layers and/or images of an ink. In some embodiments, an image or layer may be converted to a pre-cathode material or cathode material before, during or after the depositing or printing of an additional image or layer.

As used herein, converting refers to a process, for example a heating or thermal process, which converts one or more molecular precursor compounds, which may be a solid, or contained in a solution, an ink or ink composition, into a material. For example, the material may be a pre-cathode material or a cathode material.

As used herein, annealing refers to a process, for example a heating or thermal process, which transforms a material from one form into another form. For example, a pre-cathode material can be annealed to provide a cathode material.

As used herein, a component can be a compound, an element, a material, or a composition.

Isolated Molecular Precursor Compounds for Cathodes

This invention provides a range of iron-containing molecular precursor compounds for making cathodes for lithium ion batteries.

A structural feature of the molecular precursor compounds of this invention is that they contain lithium atoms along with iron atoms bound in the same precursor molecule. In general, the single molecular precursor molecule has, within its compositional structure, both lithium atoms and iron atoms. Without wishing to be bound by any particular theory, the presence of both lithium atoms and iron atoms in the same precursor molecule provides pre-existing lithium-oxygen-metal atom linkages to facilitate production of cathode materials. This feature also exists for molecular precursor compounds containing lithium atoms, iron atoms, and phosphates, as well as molecular precursor compounds containing lithium atoms, iron atoms, and siloxides.

The iron-containing molecular precursor compounds of this invention can be used to make bulk material for cathodes, or thin film cathodes.

The cathode molecular precursor compounds of this disclosure can advantageously be used to control the stoichiometry of iron atoms and lithium atoms.

The molecular precursors of this invention can have superior processability to deposit thin films for making cathodes, and provide efficient processes for making cathodes.

In general, the structure and properties of the molecular precursor compounds, inks, compositions, and materials of this invention provide advantages in making cathodes, lithium ion batteries, and devices regardless of the morphology, architecture, or manner of fabrication of the devices.

In general, a cathode molecular precursor compound may be a neutral compound, or an ionic form, or have a charged complex or counterion.

In some embodiments, a cathode molecular precursor compound can be represented in general as $LiFe^{x+}(OR)_{1+x}$, which is a compound containing lithium, iron having an oxidation state of x, and —OR groups. When M is Fe, the oxidation state x can be 2 or 3. The —OR groups can be independently, for each occurrence, selected from alkoxy, aryloxy, heteroaryloxy, alkenyloxy, siloxy, phosphinate, phosphonate, and phosphate.

In some embodiments, a cathode molecular precursor compound can be represented in general as $[LiFe^{x+}(OR)_{1+x}] \cdot nL$, where the compound includes a number n of coordinating species L.

In some embodiments, a cathode molecular precursor compound can be represented in general as $Li_2Fe^{x+}(OR)_{2+x}$, which is a compound containing two lithium atoms, iron having oxidation state x, and —OR groups. The —OR groups can be independently, for each occurrence, selected from alkoxy, aryloxy, heteroaryloxy, alkenyloxy, siloxy, phosphinate, phosphonate, and phosphate.

In some embodiments, a cathode molecular precursor compound can be represented in general as $[Li_2Fe^{x+}(OR)_{2+x}] \cdot nL$, where the compound includes a number n of coordinating species L.

Control of Lithium to Metal Stoichiometry in Cathodes with Molecular Precursor Compounds The molecular precursors of this invention can advantageously be used to control the stoichiometry of lithium to metal in cathode materials.

In some embodiments, a mixture of molecular precursor compounds can be used to control the ratio of lithium to metal atoms. A mixture of molecular precursor compounds having the formulas $LiFe^{x+}(OR)_{1+x}$ and $Li_2Fe^{y+}(OR)_{2+y}$ may be used, where x and y are the same or different and are independently selected from 2 and 3, and where (OR) is as defined above.

In some aspects, a mixture of molecular precursor compounds can be used given by Formula I

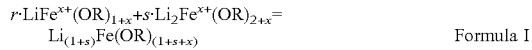

$$r \cdot LiFe^{x+}(OR)_{1+x} + s \cdot Li_2Fe^{x+}(OR)_{2+x} = Li_{(1+s)}Fe(OR)_{(1+s+x)}$$ Formula I where r+s=1, and x is the same in both compounds and is selected from 2 and 3.

In certain embodiments, when x is 2, a mixture of molecular precursor compounds having the formulas $LiFe(OR)_3$ and $Li_2Fe(OR)_4$ may be used.

In certain embodiments, when x is 3, a mixture of molecular precursor compounds having the formulas $LiFe(OR)_4$ and $Li_2Fe(OR)_5$ may be used.

In some aspects, a mixture of molecular precursor compounds having different oxidation states of iron can be used. For example, a mixture of molecular precursor compounds having the formulas $LiFe(III)(OR)_4$ and $Li_2Fe(II)(OR)_4$ may be used. In another example, a mixture of molecular precursor compounds having the formulas $LiFe(II)(OR)_3$ and $Li_2Fe(III)(OR)_5$ may be used.

In some embodiments, a mixture of molecular precursor compounds may have the composition represented by the formula $Li_{(1+s)}Fe(OR)_{(3+s)}$, wherein the oxidation state of the metal atom Fe is x=2, s is from 0.01 to 1, and the —OR groups are defined as above. The additional lithium represented by s can be from s=0.01 to 1, or from 0.01 to 0.9, or from 0.01 to 0.8, or from 0.01 to 0.7, or from 0.01 to 0.6, or from 0.01 to 0.5, or from 0.01 to 0.4, or from 0.01 to 0.3, or from 0.01 to 0.2, or from 0.01 to 0.1, or from 0.01 to 0.05. In some embodiments, s is 0.01, or 0.05, or 0.1, or 0.2, or 0.3, or 0.4, or 0.5, or 0.6, or 0.7, or 0.8, or 0.9.

In some embodiments, a mixture of molecular precursor compounds may have the composition represented by the formula $Li_{(1+s)}Fe(OR)_{(4+s)}$, wherein the oxidation state of the metal atom Fe is x=3, s is from 0.01 to 1, and the —OR groups are defined as above. The additional lithium represented by s can be from s=0.01 to 1, or from 0.01 to 0.9, or from 0.01 to 0.8, or from 0.01 to 0.7, or from 0.01 to 0.6, or from 0.01 to 0.5, or from 0.01 to 0.4, or from 0.01 to 0.3, or from 0.01 to 0.2, or from 0.01 to 0.1, or from 0.01 to 0.05. In some embodiments, s is 0.01, or 0.05, or 0.1, or 0.2, or 0.3, or 0.4, or 0.5, or 0.6, or 0.7, or 0.8, or 0.9.

In certain aspects, a mixture of molecular precursor compounds can be used to make a cathode material having the empirical formula $Li_{(1+g)}FeO_{(2+g/2)}$, where g is from 0 to 1.

In certain aspects, a mixture of molecular precursor compounds can be used to make a cathode material having the empirical formula $Li_{(1+g)}M(PO_{(4+g/2)})$, where g is from 0 to 1.

In certain aspects, a mixture of molecular precursor compounds can be used to make a cathode material having the empirical formula $Li_{(2+g)}M(SiO_{(4+g/2)})$, where g is from 0 to 1.

Structures of Isolated Molecular Precursor Compounds for Cathodes

In the formulas above, the —OR groups can be independently selected, for each occurrence, from alkoxy, aryloxy, heteroaryloxy, alkenyloxy, siloxy, phosphinate, phosphonate, and phosphate.

In some embodiments, in the formulas above, the —OR groups can be independently selected, for each occurrence, from alkoxy groups —$OR^{alk}$, wherein $R^{alk}$ can be independently selected, for each occurrence, from C(1-22)alkyl groups. In certain embodiments, $R^{alk}$ can be independently selected, for each occurrence, from C(1-6)alkyl groups. In further embodiments, $R^{alk}$ can be independently selected, for each occurrence, from ethyl, n-propyl, isopropyl, n-butyl, sec-butyl, isobutyl, t-butyl, isopentyl, 2-methylbutyl, 3-methylbutyl, 2,2-dimethylbutyl, 2,3-dimethylbutyl, 2-methylpentyl, 3-methylpentyl, and 4-methylpentyl.

In some embodiments, in the formulas above, the —OR groups can be independently selected, for each occurrence, from aryloxy groups —$OR^{aryl}$, wherein $R^{aryl}$ can be independently selected, for each occurrence, from phenyl, alkyl substituted phenyl, naphthyl, tetrahydro-naphthyl, indanyl, and biphenyl.

In certain embodiments, in the formulas above, the —OR groups can be independently selected, for each occurrence, from siloxy groups —$OSi(OR^{sil})_3$, —$OSi(OR^{sil})_2R^2$, —$OSi(OR^{sil})R^2_2$, and —$OSiR^2_3$, wherein $R^{sil}$ and $R^2$ can be independently selected, for each occurrence, from alkyl, aryl, heteroaryl, alkenyl, and silyl groups.

In certain embodiments, in the formulas above, the —OR groups can be independently selected, for each occurrence, from alkoxysiloxy groups, alkoxyalkylsiloxy groups, and alkylsiloxy groups.

In the formulas above, the —OR groups can be independently selected, for each occurrence, from phosphate groups —OP(O)(OR$^{phos}$)$_2$, phosphonate groups —OP(O)(OR$^{phos}$)R$^2$, and phosphinate groups —OP(O)R$^2_2$, wherein R$^{phos}$ and R$^2$ can be independently selected, for each occurrence, from alkyl, aryl, heteroaryl, alkenyl, and silyl groups.

Any of a phosphate group, a phosphonate group, and a phosphinate group can be terminal or bridging.

In some embodiments, a molecular precursor compound may have one or more —OR or —ORO— groups that are μ-2 or μ-3 bridging.

For example, the empirical formula LiFe(OR)$_3$ can represent a molecule having one or more —OR or —ORO— groups that are μ-2 or μ-3 bridging.

In certain embodiments, a molecular precursor compound may have one or more —OR(O)— groups that are carboxylate groups.

In certain embodiments, a molecular precursor compound may have one or more —ORO— groups that are dialkoxy groups.

In some aspects, in the above formulas, the coordinating species L can be molecules, functional groups, or moieties that interact with one or more atoms of a molecular precursor compound.

In some aspects, in the above formulas, the coordinating species L can be molecules of a coordinating solvent, coordinating molecular species, electron-donating groups, electron-donating species, or chelating groups or species. Each of the n coordinating species L can be different from the others. A coordinating species L may be monodentate, bidentate or multidentate. One or more of the coordinating species L in a formula may be attached to a metal atom.

The number, n, of coordinating species L can be from zero to four, or from zero to eight.

Examples of Molecular Precursor Compounds

Preferred molecular precursor molecules of this invention may be based on lithium-iron compounds.

In some embodiments, a cathode molecular precursor compound can be represented by the empirical formula

[LiFe(OR)$^d$(OR)$^e$(OR)$^f$]

where the —OR groups d, e and f are the same or different and are as defined above.

In some embodiments, a cathode molecular precursor compound can be represented by the empirical formula

[LiFe(OR)$^d$(OR)$^e$(OR)$^f$(OR)$^g$]

where the —OR groups d, e, f and g are the same or different and are as defined above.

In some embodiments, a cathode molecular precursor compound can be represented by the empirical formula

[Li$_2$Fe(OR)$^d$(OR)$^e$(OR)$^f$(OR)$^g$]

where the —OR groups d through g are the same or different and are as defined above.

In some embodiments, a cathode molecular precursor compound can be represented by the empirical formula

[Li$_2$Fe(OR)$^d$(OR)$^e$(OR)$^f$(OR)$^g$(OR)$^h$]

where the —OR groups d through h are the same or different and are as defined above.

Examples of molecular precursor compounds include [LiFe(O$^n$Bu)$_3$], [LiFe(O$^s$Bu)$_3$], [LiFe(O$^t$Bu)$_3$], [LiFe(O$^i$Pr)$_3$], [LiFe(O$^n$Pr)$_3$], [LiFe(OEt)$_3$], [LiFe(O(n-pentyl))$_3$], [LiFe(O(n-hexyl))$_3$], [LiFe(O$^t$Bu)(O$^n$Bu)$_2$], [LiFe(O$^s$Bu)(O$^n$Bu)$_2$], [LiFe(O$^i$Pr)(O$^n$Bu)$_2$], [LiFe(O$^n$Bu)(O$^t$Bu)$_2$], [LiFe(O$^n$Bu)(O$^s$Bu)$_2$], [LiFe(O$^n$Bu)(O$^i$Pr)$_2$], [LiFe(O$^s$Bu)(O$^t$Bu)$_2$], [LiFe(O$^t$Bu)(O$^s$Bu)$_2$], and [LiFe(O$^n$Bu)(O$^t$Bu)(O$^s$Bu)].

Examples of molecular precursor compounds include [LiFe(OP(O)(O$^n$Bu)$_2$)$_3$], [LiFe(OP(O)(O$^s$Bu)$_2$)$_3$], [LiFe(OP(O)(O$^t$Bu)$^2$)$_3$], [LiFe(OP(O)(O$^i$Pr)$_2$)$_3$], [LiFe(OP(O)(O$^n$Pr)$_2$)$_3$], [LiFe(OP(O)(OEt)$_2$)$_3$], [LiFe(OP(O)(O(n-pentyl))$_2$)$_3$], [LiFe(OP(O)(O(n-hexyl))$_2$)$_3$], [LiFe(O$^t$Bu)(OP(O)(O$^n$Bu)$_2$)$_2$], [LiFe(O$^s$Bu)(OP(O)(O$^n$Bu)$_2$)$_2$], [LiFe(O$^i$Pr)(OP(O)(O$^n$Bu)$_2$)$_2$], [LiFe(O$^n$Bu)(OP(O)(O$^t$Bu)$_2$)$_2$], [LiFe(O$^n$Bu)(OP(O)(O$^s$Bu)$_2$)$_2$], [LiFe(O$^n$Bu)(OP(O)(O$^i$Pr)$_2$)$_2$], [LiFe(O$^s$Bu)(OP(O)(O$^t$Bu)$_2$)$_2$], [LiFe(OP(O)(O$^s$Bu)$_2$)(O$^s$Bu)$_2$], and [LiFe(OP(O)(O$^i$Pr)$_2$)(O$^t$Bu)(O$^s$Bu)].

Examples of molecular precursor compounds include [LiFe(OSi(O$^t$Bu)$_3$)$_3$], [LiFe(OSi(O$^t$Bu)$_2$$^s$Bu)$_3$], [LiFe(OSi(O$^t$Bu)$^s$Bu$_2$)$_3$], [LiFe(OSi$^s$Bu$_3$)$_3$], [LiFe(Osi$^n$Bu$_3$)$_3$], [LiFe(O$^n$Bu)(OSi(O$^t$Bu)$_3$)$_2$], [LiFe(O$^s$Bu)(OSi(O$^t$Bu)$_3$)$_2$], and [LiFe(O$^n$Bu)(OSi(O$^t$Bu)$_2$$^n$Bu)$_2$].

Examples of molecular precursor compounds include [Li$_2$Fe(O$^n$Bu)$_4$], [Li$_2$Fe(O$^s$Bu)$_4$], [Li$_2$Fe(O$^t$Bu)$_4$], [Li$_2$Fe(O$^i$Pr)$_4$], [Li$_2$Fe(O$^n$Pr)$_4$], [Li$_2$Fe(OEt)$_4$], [Li$_2$Fe(O(n-pentyl))$_4$], [Li$_2$Fe(O(n-hexyl))$_4$], [Li$_2$Fe(O$^t$Bu)(O$^n$Bu)$_3$], [Li$_2$Fe(O$^s$Bu)(O$^n$Bu)$_3$], [Li$_2$Fe(O$^i$Pr)(O$^n$Bu)$_3$], [Li$_2$Fe(O$^n$Bu)(O$^t$Bu)$_3$], [Li$_2$Fe(O$^n$Bu)(O$^s$Bu)$_3$], [Li$_2$Fe(O$^n$Bu)(O$^i$Pr)$_3$], [Li$_2$Fe(O$^s$Bu)(O$^t$Bu)$_3$], [Li$_2$Fe(O$^t$Bu)(O$^s$Bu)$_3$], and [Li$_2$Fe(O$^n$Bu)(O$^t$Bu)(O$^s$Bu)2].

Examples of molecular precursor compounds include [Li$_2$Fe(OP(O)(O$^n$Bu)$_2$)$_4$], [Li$_2$Fe(OP(O)(O$^s$Bu)$_2$)$_4$], [Li$_2$Fe(OP(O)(O$^t$Bu)$_2$)$_4$], [Li$_2$Fe(OP(O)(O$^i$Pr)$_2$)$_4$], [Li$_2$Fe(OP(O)(O$^n$Pr)$_2$)$_4$], [Li$_2$Fe(OP(O)(OEt)$_2$)$_4$], [Li$_2$Fe(OP(O)(O(n-pentyl))$_2$)$_4$], [Li$_2$Fe(OP(O)(O(n-hexyl))$_2$)$_4$], and [Li$_2$Fe(O$^t$Bu)(OP(O)(O$^n$Bu)$_2$)$_3$].

Examples of molecular precursor compounds include [Li$_2$Fe(OSi(O$^t$Bu)$_3$)$_4$], [Li$_2$Fe(OSi(O$^t$Bu)$_2$$^s$Bu)$_4$], [Li$_2$Fe(OSi(O$^t$Bu)$^s$Bu$_2$)$_4$], [Li$_2$Fe(OSi$^s$Bu$_3$)$_4$], [Li$_2$Fe(Osi$^n$Bu$_3$)$_4$], [Li$_2$Fe(O$^n$Bu)(OSi(O$^t$Bu)$_3$)$_3$], [Li$_2$Fe(O$^s$Bu)(OSi(O$^s$Bu)$_3$)$_3$], and [Li$_2$Fe(O$^n$Bu)(OSi(O$^t$Bu)$_2$$^n$Bu)$_3$].

Examples of molecular precursor compounds include Li$_2$Fe[OSi(O$^t$Bu)$_3$](O$^s$Bu)$_3$, Li$_2$Fe[OSi(O$^t$Bu)$_3$](O$^s$Bu)$_4$.

Examples of molecular precursor compounds include [LiFe(O$^n$Bu)$_4$], [LiFe(O$^s$Bu)$_4$], [LiFe(O$^t$Bu)$_4$], [LiFe(O$^i$Pr)$_4$], [LiFe(O$^n$Pr)$_4$], [LiFe(OEt)$_4$], [LiFe(O(n-pentyl))$_4$], [LiFe(O(n-hexyl))$_4$], [LiFe(O$^t$Bu)(O$^n$Bu)$_3$], [LiFe(O$^s$Bu)(O$^n$Bu)$_3$], [LiFe(O$^i$Pr)(O$^n$Bu)$_3$], [LiFe(O$^n$Bu)(O$^t$Bu)$_3$], [LiFe(O$^n$Bu)(O$^s$Bu)$_3$], [LiFe(O$^n$Bu)(O$^i$Pr)$_3$], [LiFe(O$^s$Bu)(O$^t$Bu)$_3$], [LiFe(O$^t$Bu)(O$^s$Bu)$_3$], and [LiFe(O$^n$Bu)(O$^t$Bu)(O$^s$Bu)(O$^i$Pr)].

Examples of molecular precursor compounds include [LiFe(OP(O)(O$^n$Bu)$_2$)$_4$], [LiFe(OP(O)(O$^s$Bu)$_2$)$_4$], [LiFe(OP(O)(O$^t$Bu)$_2$)$_4$], [LiFe(OP(O)(O$^i$Pr)$_2$)$_4$], [LiFe(OP(O)(O$^n$Pr)$_2$)$_4$], [LiFe(OP(O)(OEt)$_2$)$_4$], [LiFe(OP(O)(O(n-pentyl))$_2$)$_4$], [LiFe(OP(O)(O(n-hexyl)$_2$)$_4$], [LiFe(O$^t$Bu)(OP(O)(O$^n$Bu)$_2$)$_3$], [LiFe(O$^s$Bu)(OP(O)(O$^n$Bu)$_2$)$_3$], [LiFe(O$^i$Pr)(OP(O)(O$^n$Bu)$_2$)$_3$], [LiFe(O$^n$Bu)(OP(O)(O$^t$Bu)$_2$)$_3$], [LiFe(O$^n$Bu)(OP(O)(O$^s$Bu)$_2$)$_3$], [LiFe(O$^n$Bu)(OP(O)(O$^i$Pr)$_2$)$_3$], [LiFe(O$^s$Bu)(OP(O)(O$^t$Bu)$_2$)$_3$], [LiFe(O$^t$Bu)(OP(O)(O$^s$Bu)$_2$)$_3$], and [LiFe(OP(O)(O$^n$Bu)$_2$)(O$^t$Bu)(O$^s$Bu)(O$^i$Pr)].

Examples of molecular precursor compounds include [LiFe(OSi(O$^t$Bu)$_4$], [LiFe(OSi(O$^t$Bu)$_2$$^s$Bu)$_4$], [LiFe(OSi(O$^t$Bu)$^s$Bu$_2$)$_4$], [LiFe(OSi$^s$Bu$_3$)$_4$], [LiFe(OSi(O$^n$Bu)$_3$)$_4$], [LiFe(O$^n$Bu)(OSi(O$^t$Bu)$_3$)$_3$], [LiFe(O$^s$Bu)(OSi(O$^t$Bu)$_3$)$_3$], and [LiFe(O$^n$Bu)$_2$(OSi(O$^t$Bu)$_2$$^n$Bu)$_2$].

Any of the foregoing cathode molecular precursor compounds can be found in a monomeric, dimeric, trimeric, or multimeric form.

Coordinating Species L

Examples of coordinating species L include acetates, ethyl acetate, propyl acetates, n-propyl acetate, isopropyl acetate, butyl acetates, n-butyl acetate, sec-butyl acetate, isobutyl acetate, t-butyl acetate, isopentyl acetate, 2-methylbutyl acetate, 3-methylbutyl acetate, 2,2-dimethylbutyl acetate, 2,3-dimethylbutyl acetate, 2-methylpentyl acetate, 3-methylpentyl acetate, 4-methylpentyl acetate, 2-methylhexyl acetate, 3-methylhexyl acetate, 4-methylhexyl acetate, 5-methylhexyl acetate, 2,3-dimethylbutyl acetate, 2,3-dimethylpentyl acetate, 2,4-dimethylpentyl acetate, 2,2-dimethylhexyl acetate, 2,3-dimethylhexyl acetate, 2,4-dimethylhexyl acetate, 2,5-dimethylhexyl acetate, 2,2-dimethylpentyl acetate, 3,3-dimethylpentyl acetate, 3,3-dimethylhexyl acetate, 4,4-dimethylhexyl acetate, 2-ethylpentyl acetate, 3-ethylpentyl acetate, 2-ethylhexyl acetate, 3-ethylhexyl acetate, 4-ethylhexyl acetate, 2-methyl-2-ethylpentyl acetate, 2-methyl-3-ethylpentyl acetate, 2-methyl-4-ethylpentyl acetate, 2-methyl-2-ethylhexyl acetate, 2-methyl-3-ethylhexyl acetate, 2-methyl-4-ethylhexyl acetate, 2,2-diethylpentyl acetate, 3,3-diethylhexyl acetate, 2,2-diethylhexyl acetate, 3,3-diethylhexyl acetate, n-heptyl acetate, n-octyl acetate, n-nonyl acetate, n-decyl acetate, n-undecyl acetate, n-dodecyl acetate, n-tridecyl acetate, n-tetradecyl acetate, n-pentadecyl acetate, n-hexadecyl acetate, n-heptadecyl acetate, n-octadecyl acetate, esters, alkylesters, arylesters, ketones, alkylketones, arylketones, acetone, alcohols, diols, thiols, methanol, ethanol, propan-1-ol, propan-2-ol, butan-1-ol, 2-methylpropan-1-ol, butan-2-ol, 2-methylpropan-2-ol, pentanol, hexanol, ethers, alkylethers, arylethers, diethylether, tetrahydrofuran, 2-methyl-tetrahydrofuran, amines, diamines, triamines, trimethylamine, ethylenediamine, acetonitrile, pyridine, and mixtures of the foregoing.

Molecular Precursors

In solution, a molecular precursor of this invention having the empirical formula [Li$_2$M(OR)$_4$]·nL may have structural Formula 2A

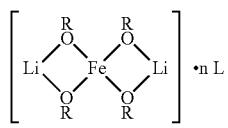

Formula 2A where L is as defined above and may be the same or different, and the —OR groups are as defined above.

In Formula 2A, the molecular precursor may have from one to eight coordinating species L, and two coordinating species L may be attached to each other when binding to the same metal atom.

In solution, a molecular precursor of this invention having the empirical formula [LiM(OR)$_3$]·L$_2$ may have the structural Formula 2B

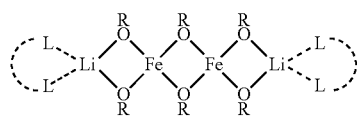

Formula 2B where L is as defined above and may be the same or different, and the —OR groups are as defined above.

In Formula 2B, the molecular precursor may have from one to eight coordinating species L, and two coordinating species L may be attached to each other when binding to the same metal atom. The dotted bonds in Formula 2A indicate that the coordinating species L are optionally present, and/or optionally attached to each other.

In certain embodiments, one or more of the coordinating species L may be attached to a metal atom M.

In solution, a molecular precursor of this invention having the empirical formula [LiM(OR)$_3$]·nL may have the structural Formula 2C

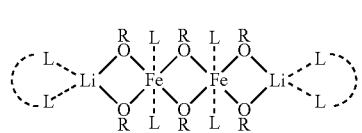

Formula 2C where each M is Fe, L is as defined above and may be the same or different, and the —OR groups are as defined above.

In solution, a molecular precursor of this invention having the empirical formula [LiM(OR)$_3$]·nL may have the structural Formula 2D

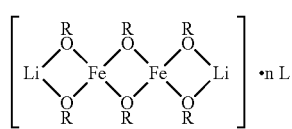

Formula 2D where each M is Fe, L is as defined above and may be the same or different, n is from ½ to eight, and the —OR groups are as defined above.

In solution, a molecular precursor of this invention having the empirical formula [LiM(ORO)(OR)$_2$]·nL may have the structural Formula 2E

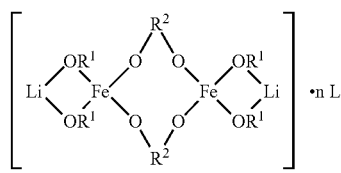

Formula 2E where M is Fe, L is as defined above, n is from ½ to eight, the —OR$^2$O— groups are dialkoxy groups wherein R$^2$ may be a substituted or unsubstituted, branched or unbranched alkylene chain —(CH$_2$)$_q$—, where q is from 1 to 20, and the —OR$^1$ are as defined above. In some embodiments, the —OR$^2$O— groups can be bridging phosphonate, phosphinate, or phosphate groups, wherein —OR$^2$O— represents OP(O)(OR$^4$)$_{2-x}$R$^5_x$— as shown below

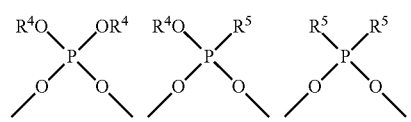

where x is 0, 1 or 2, and groups $R^4$ and $R^5$ can be independently, for each occurrence, alkyl, aryl, heteroaryl, alkenyl, silyl, and inorganic and organic groups.

In solution, a molecular precursor of this invention having the empirical formula $[Li_2M_2(ORO)(OR)_4] \cdot nL$ may have the structural 2F

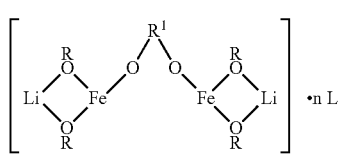

Formula 2F where M is Fe, L is as defined above, n is from ½ to eight, the —OR$^1$O— groups are dialkoxy groups wherein $R^1$ may be a substituted or unsubstituted, branched or unbranched alkylene chain $—(CH_2)_q—$, where q is from 1 to 20, and the —OR groups are as defined above.

In some embodiments, a molecular precursor compound may have one or more —OR or —ORO— groups that are μ-2 or μ-3 bridging.

For example, the empirical formula $LiM(OR)_3$ can represent a molecule having one or more —OR or —ORO— groups that are μ-2 or μ-3 bridging.

In certain embodiments, a molecular precursor compound may have one or more —OR(O)— groups that are carboxylate groups.

In certain embodiments, a molecular precursor compound may have one or more —ORO— groups that are dialkoxy groups.

In some embodiments, a molecular precursor compound may exist in a dimeric form under ambient conditions, or a trimeric or higher form, and can be used as a reagent in such forms. It is understood that the term compound refers to all such forms, whether found under ambient conditions, or found during the process for synthesizing a molecular precursor.

The molecular precursors of this invention can be advantageously soluble in one or more organic solvents.

For the molecular precursors of this invention, the group R in the formulas above, or a portion thereof, may be a good leaving group in relation to a transition of the molecular precursor compound at elevated temperatures or upon application of energy.

Examples of R alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl and n-octadecyl.

Examples of R alkyl groups include isopropyl, sec-butyl, isobutyl, tert-butyl, isopentyl, 2-methylbutyl, 3-methylbutyl, 2,2-dimethylbutyl, 2,3-dimethylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, 2,3-dimethylpentyl, 2,4-dimethylpentyl, 2,2-dimethylhexyl, 2,3-dimethylhexyl, 2,4-dimethylhexyl, 2,5-dimethylhexyl, 2,2-dimethylpentyl, 3,3-dimethylpentyl, 3,3-dimethylhexyl, 4,4-dimethylhexyl, 2-ethylpentyl, 3-ethylpentyl, 2-ethylhexyl, 3-ethylhexyl, 4-ethylhexyl, 2-methyl-2-ethylpentyl, 2-methyl-3-ethylpentyl, 2-methyl-4-ethylpentyl, 2-methyl-2-ethylhexyl, 2-methyl-3-ethylhexyl, 2-methyl-4-ethylhexyl, 2,2-diethylpentyl, 3,3-diethylhexyl, 2,2-diethylhexyl, and 3,3-diethylhexyl.

Examples of —OR alkoxy groups include alkoxyalkyl, alkoxyalkoxy, and alkylcarbonyl.

Examples of —OR alkoxy groups include methoxy, ethoxy, n-propoxy, 1-methylethoxy (isopropoxy), butoxy, 1-methylpropoxy (sec-butoxy), 2-methylpropoxy (isobutoxy) or 1,1-dimethylethoxy (tert-butoxy), pentoxy, 1-methylbutoxy, 2-methylbutoxy, 3-methylbutoxy, 1,1-dimethylpropoxy, 1,2-dimethylpropoxy, 2,2-dimethylpropoxy, 1-ethylpropoxy, hexoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy or 1-ethyl-2-methylpropoxy, heptyloxy, octyloxy, 2-ethylhexyloxy, nonyloxy, decyloxy, and positional isomers thereof.

Examples of R aryl groups include phenyl, naphthyl, anthracenyl, and phenanthrenyl.

In further embodiments, the groups R may independently be (C1-22)alkyl groups. In these embodiments, the alkyl group may be a (C1)alkyl (methyl), or a (C2)alkyl (ethyl), or a (C3)alkyl (propyl), or a (C4)alkyl (butyl), or a (C5)alkyl, or a (C6)alkyl, or a (C7)alkyl, or a (C8)alkyl, or a (C9)alkyl, or a (C10)alkyl, or a (C11)alkyl, or a (C12)alkyl, or a (C13)alkyl, or a (C14)alkyl, or a (C15)alkyl, or a (C16)alkyl, or a (C17)alkyl, or a (C18)alkyl, or a (C19)alkyl, or a (C20)alkyl, or a (C21)alkyl, or a (C22)alkyl.

In certain embodiments, the groups R may independently be (C1-12)alkyl groups. In these embodiments, the alkyl group may be a (C1)alkyl (methyl), or a (C2)alkyl (ethyl), or a (C3)alkyl, or a (C4)alkyl, or a (C5)alkyl, or a (C6)alkyl, or a (C7)alkyl, or a (C8)alkyl, or a (C9)alkyl, or a (C10)alkyl, or a (C11)alkyl, or a (C12)alkyl.

In certain embodiments, the groups R may independently be (C1-6)alkyl groups. In these embodiments, the alkyl group may be a (C1)alkyl (methyl), or a (C2)alkyl (ethyl), or a (C3)alkyl, or a (C4)alkyl, or a (C5)alkyl, or a (C6)alkyl.

A molecular precursor compound may be crystalline, or non-crystalline.

Preparation of Molecular Precursors

Embodiments of this invention provide a family of molecular precursor molecules and compositions.

Advantageously facile routes for the synthesis and isolation of molecular precursor compounds of this invention have been discovered, as described below.

This disclosure provides a range of molecular precursor compositions which can be transformed into cathodes and cathode materials. In some aspects, the molecular precursor compositions are precursors for the formation of cathodes.

In some aspects, a molecular precursor compound can be made by Reaction Scheme 1

REACTION SCHEME 1:

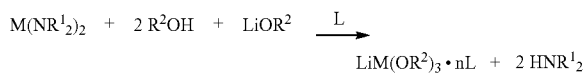

where M is Fe, n is from 0 to 4, $R^1$ is alkyl, aryl, heteroaryl, alkenyl, or silyl, and the —OR$^2$ groups can be independently selected, for each occurrence, from alkoxy, aryloxy, heteroaryloxy, alkenyloxy, siloxy, phosphinate, phosphonate, and phosphate.

In Reaction Scheme 1, $M(NR^1_2)_2$ is reacted with an alcohol and LiOR$^2$ to provide a molecular precursor.

In some embodiments, $M(NR^1_2)_2$ is reacted with an alcohol and a lithium alkoxide to provide a molecular precursor.

In some embodiments, $R^2OH$ is $HOSi(OR^3)_3$, $HOSi(OR^3)_2R^4$, $HOSi(OR^3)R^4{}_2$, or $HOSiR^4{}_3$, wherein $R^3$ and $R^4$ are independently selected from alkyl, aryl, heteroaryl, or alkenyl.

In some embodiments, $LiOR^2$ is $LiOSi(OR^4)_3$, wherein $R^4$ is alkyl, aryl, heteroaryl, or alkenyl.

In some embodiments, $R^2OH$ is $HOP(O)(OR^5)_2$, or $HOP(O)(OR^5)R^5$, or $HOP(O)R^5{}_2$, wherein $R^5$ is alkyl, aryl, heteroaryl, or alkenyl.

In some embodiments, $LiOR^2$ is $LiOP(O)(OR^6)_2$, or $LiOP(O)(OR^6)R^6$, or $LiOP(O)R^6{}_2$, wherein $R^6$ is alkyl, aryl, heteroaryl, or alkenyl.

In some aspects, a molecular precursor compound can be made by Reaction Scheme 2

REACTION SCHEME 2:

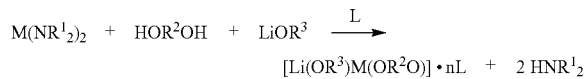

$$M(NR^1{}_2)_2 \;+\; HOR^2OH \;+\; LiOR^3 \xrightarrow{L} [Li(OR^3)M(OR^2O)] \cdot nL \;+\; 2\,HNR^1{}_2$$

where M is Fe, n is from 0 to 4, $R^1$ is alkyl, aryl, heteroaryl, alkenyl, or silyl; the $-OR^3$ groups can be independently selected, for each occurrence, from alkoxy, aryloxy, heteroaryloxy, alkenyloxy, siloxy, phosphinate, phosphonate, and phosphate; and the $R^2$ of the $-OR^2O-$ groups can be alkylene, alkylene-aryl-alkylene, or alkylene-alkenyl-alkylene. Examples of alkylene include $-(CH_2)_q-$, where q is from 1 to 20. An alkylene group may be branched or unbranched, or substituted or unsubstituted.

In Reaction Scheme 2, $M(NR^1{}_2)_2$ is reacted with a diol and $LiOR^3$ to provide a molecular precursor.

In some embodiments, $M(NR^1{}_2)_2$ is reacted with a diol and a lithium alkoxide to provide a molecular precursor.

[Li(OR)M(ORO)] may from a dimer or multimer, $[Li(OR)M(ORO)]_x$, where x is two or more.

In some embodiments, $LiOR^3$ is $LiOSi(OR^4)_3$, wherein $R^4$ is alkyl, aryl, heteroaryl, or alkenyl.

In some embodiments, $LiOR^3$ is $LiOP(O)(OR^5)_2$, or $LiOP(O)(OR^5)R^6$, or $LiOP(O)R^5{}_2$, wherein $R^6$ is alkyl, aryl, heteroaryl, or alkenyl.

In some aspects, a molecular precursor compound can be made by Reaction Scheme 3

REACTION SCHEME 3:

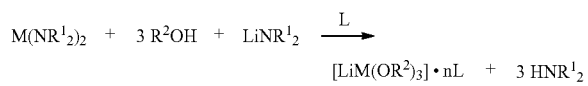

$$M(NR^1{}_2)_2 \;+\; 3\,R^2OH \;+\; LiNR^1{}_2 \xrightarrow{L} [LiM(OR^2)_3] \cdot nL \;+\; 3\,HNR^1{}_2$$

where M is Fe, n is from 0 to 4, $R^1$ can be independently selected, for each occurrence, from alkyl, aryl, heteroaryl, alkenyl, and silyl, and the $-OR^2$ groups can be independently selected, for each occurrence, from alkoxy, aryloxy, heteroaryloxy, alkenyloxy, siloxy, phosphinate, phosphonate, and phosphate.

In Reaction Scheme 3, $M(NR^1{}_2)_2$ is reacted with an alcohol and $LiNR^1{}_2$ to provide a molecular precursor.

In some embodiments, $M(NR^1{}_2)_2$ is reacted with an alcohol and a lithium amine to provide a molecular precursor.

In some embodiments, $R^2OH$ is $HOP(O)(OR^5)_2$, or $HOP(O)(OR^5)R^6$, or $HOP(O)R^5{}_2$, wherein $R^5$ is alkyl, aryl, heteroaryl, or alkenyl, and $R^6$ is alkyl, aryl, heteroaryl, or alkenyl.

In some embodiments, molecular precursor compounds are made by following reaction:

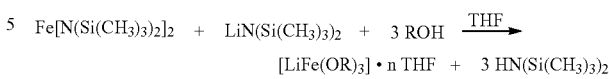

$$Fe[N(Si(CH_3)_3)_2]_2 \;+\; LiN(Si(CH_3)_3)_2 \;+\; 3\,ROH \xrightarrow{THF} [LiFe(OR)_3] \cdot n\,THF \;+\; 3\,HN(Si(CH_3)_3)_2$$

where R is ethyl, isopropyl, sec-butyl, n-butyl, or t-butyl.

In some aspects, a molecular precursor compound can be made by Reaction Scheme 4

REACTION SCHEME 4:

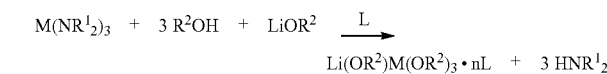

$$M(NR^1{}_2)_3 \;+\; 3\,R^2OH \;+\; LiOR^2 \xrightarrow{L} Li(OR^2)M(OR^2)_3 \cdot nL \;+\; 3\,HNR^1{}_2$$

where M is Fe, n is from 0 to 8, $R^1$ can be independently selected, for each occurrence, from alkyl, aryl, heteroaryl, alkenyl, and silyl, and the $-OR^2$ groups can be independently selected, for each occurrence, from alkoxy, aryloxy, heteroaryloxy, alkenyloxy, siloxy, phosphinate, phosphonate, and phosphate.

In Reaction Scheme 4, $M(NR^1{}_2)_3$ is reacted with an alcohol and $LiOR^2$ to provide a molecular precursor.

In some embodiments, $M(NR^1{}_2)_3$ is reacted with an alcohol and a lithium alkoxide to provide a molecular precursor.

In some embodiments, $R^2OH$ is $HOSi(OR^3)_3$, $HOSi(OR^3)_2R^4$, $HOSi(OR^3)R^4{}_2$, or $HOSiR^4{}_3$, wherein $R^3$ and $R^4$ are independently selected from alkyl, aryl, heteroaryl, or alkenyl.

In some embodiments, $LiOR^2$ is $LiOSi(OR^4)_3$, wherein $R^4$ is alkyl, aryl, heteroaryl, or alkenyl.

In some embodiments, $R^2OH$ is $HOP(O)(OR^5)_2$, or $HOP(O)(OR^5)R^5$, or $HOP(O)R^5{}_2$, wherein $R^5$ is alkyl, aryl, heteroaryl, or alkenyl.

In some embodiments, $LiOR^2$ is $LiOP(O)(OR^6)_2$, or $LiOP(O)(OR^6)R^6$, or $LiOP(O)R^6{}_2$, wherein $R^6$ is alkyl, aryl, heteroaryl, or alkenyl.

In some aspects, a molecular precursor compound can be made by Reaction Scheme 5

REACTION SCHEME 5:

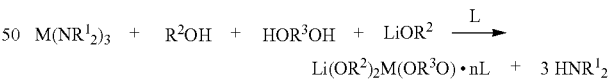

$$M(NR^1{}_2)_3 \;+\; R^2OH \;+\; HOR^3OH \;+\; LiOR^2 \xrightarrow{L} Li(OR^2)_2M(OR^3O) \cdot nL \;+\; 3\,HNR^1{}_2$$

where M is Fe, n is from 0 to 8, $R^1$ can be independently selected, for each occurrence, from alkyl, aryl, heteroaryl, alkenyl, and silyl, the $-OR^2$ groups can be independently selected, for each occurrence, from alkoxy, aryloxy, heteroaryloxy, alkenyloxy, siloxy, phosphinate, phosphonate, and phosphate, and the $-OR^3O-$ groups can be as defined above.

In Reaction Scheme 5, $M(NR^1{}_2)_3$ is reacted with a alcohol, a diol and $LiOR^2$ to provide a molecular precursor.

In some embodiments, $M(NR^1{}_2)_3$ is reacted with an alcohol, a diol and a lithium alkoxide to provide a molecular precursor.

$[Li(OR^2)_2M(OR^2O)]$ may from a dimer or multimer, $[Li(OR^2)_2M(OR^2O)]_x$, where x is two or more.

In some embodiments, $R^2OH$ is $HOSi(OR^3)_3$, $HOSi(OR^3)_2R^4$, $HOSi(OR^3)R^4{}_2$, or $HOSiR^4{}_3$, wherein $R^3$ and $R^4$ are independently selected from alkyl, aryl, heteroaryl, or alkenyl.

In some embodiments, $LiOR^2$ is $LiOSi(OR^4)_3$, wherein $R^4$ is alkyl, aryl, heteroaryl, or alkenyl.

In some embodiments, $R^2OH$ is $HOP(O)(OR^5)_2$, or $HOP(O)(OR^5)R^5$, or $HOP(O)R^5{}_2$, wherein $R^5$ is alkyl, aryl, heteroaryl, or alkenyl.

In some embodiments, $LiOR^2$ is $LiOP(O)(OR^6)_2$, or $LiOP(O)(OR^6)R^6$, or $LiOP(O)R^6{}_2$, wherein $R^6$ is alkyl, aryl, heteroaryl, or alkenyl.

In some aspects, a molecular precursor compound can be made by Reaction Scheme 6

REACTION SCHEME 6:

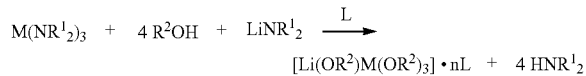

where M is Fe, n is from 0 to 8, $R^1$ can be independently selected, for each occurrence, from alkyl, aryl, heteroaryl, alkenyl, and silyl, and the $-OR^2$ groups can be independently selected, for each occurrence, from alkoxy, aryloxy, heteroaryloxy, alkenyloxy, siloxy, phosphinate, phosphonate, and phosphate.

In Reaction Scheme 6, $M(NR^1{}_2)_3$ is reacted with an alcohol and $LiNR_2$ to provide a molecular precursor.

In some embodiments, $M(NR^1{}_2)_2$ is reacted with an alcohol and a lithium amine to provide a molecular precursor.

In some embodiments, $R^2OH$ is $HOSi(OR^3)_3$, $HOSi(OR^3)_2R^4$, $HOSi(OR^3)R^4{}_2$, or $HOSiR^4{}_3$, wherein $R^3$ and $R^4$ are independently selected from alkyl, aryl, heteroaryl, or alkenyl.

In some embodiments, $R^2OH$ is $HOP(O)(OR^5)_2$, or $HOP(O)(OR^5)R^5$, or $HOP(O)R^5{}_2$, wherein $R^5$ is alkyl, aryl, heteroaryl, or alkenyl.

In some aspects, a molecular precursor compound can be made by Reaction Scheme 7

REACTION SCHEME 7:

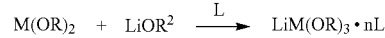

where M is Fe, n is from 0 to 4, and the $-OR$ groups can be independently selected, for each occurrence, from alkoxy, aryloxy, heteroaryloxy, alkenyloxy, siloxy, phosphinate, phosphonate, and phosphate.

In Reaction Scheme 7, $M(OR)_2$ is reacted with LiOR to provide a molecular precursor.

In some embodiments, $M(OR)_2$ is reacted with a lithium alkoxide to provide a molecular precursor.

In some embodiments, LiOR is $LiOSi(OR)_3$.

In some embodiments, LiOR is $LiOP(O)(OR)_2$, or $LiOP(O)(OR)R$, or $LiOP(O)R_2$.

In some aspects, a molecular precursor compound can be made by Reaction Scheme 8

REACTION SCHEME 8:

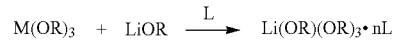

where M is Fe, n is from 0 to 4, and the $-OR$ groups can be independently selected, for each occurrence, from alkoxy, aryloxy, heteroaryloxy, alkenyloxy, siloxy, phosphinate, phosphonate, and phosphate.

In Reaction Scheme 8, $M(OR)_3$ is reacted with LiOR to provide a molecular precursor.

In some embodiments, $M(OR)_3$ is reacted with a lithium alkoxide to provide a molecular precursor.

In some embodiments, LiOR is $LiOSi(OR)_3$.

In some embodiments, LiOR is $LiOP(O)(OR)_2$, or $LiOP(O)(OR)R$, or $LiOP(O)R_2$.

In some aspects, a molecular precursor compound can be made by Reaction Scheme 9

REACTION SCHEME 9:

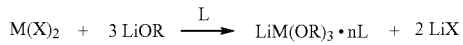

where M is Fe, L is a coordinating species, X is halogen, n is from 0 to 4, and the $-OR$ groups can be independently selected, for each occurrence, from alkoxy, aryloxy, heteroaryloxy, alkenyloxy, siloxy, phosphinate, phosphonate, and phosphate.

In Reaction Scheme 9, $M(X)_2$ is reacted with LiOR to provide a molecular precursor.

In some embodiments, $M(X)_2$ is reacted with a lithium alkoxide to provide a molecular precursor.

In some embodiments, LiOR is $LiOSi(OR)_3$.

In some embodiments, LiOR is $LiOP(O)(OR)_2$, or $LiOP(O)(OR)R$, or $LiOP(O)R_2$.

In some aspects, a molecular precursor compound can be made by Reaction Scheme 10

REACTION SCHEME 10:

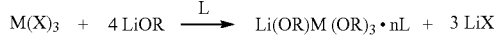

where M is Fe, X is halogen, L is a coordinating species, n is from 0 to 8, and the $-OR$ groups can be independently selected, for each occurrence, from alkoxy, aryloxy, heteroaryloxy, alkenyloxy, siloxy, phosphinate, phosphonate, and phosphate.

In Reaction Scheme 10, $M(X)_3$ is reacted with LiOR to provide a molecular precursor.

In some embodiments, $M(X)_3$ is reacted with a lithium alkoxide to provide a molecular precursor.

In some embodiments, LiOR is $LiOSi(OR)_3$.

In some embodiments, LiOR is $LiOP(O)(OR)_2$, or $LiOP(O)(OR)R$, or $LiOP(O)R_2$.

In the above reaction schemes, the reagent $M(NR_2)_2$ can be provided by reacting $MX_2$ with 2 equivalents of $LiNR_2$, $NaNR_2$, or $KNR_2$, where X is halogen.

In the above reaction schemes, the reagent $M(NR_2)_3$ can be provided by reacting $MX_2$ with 3 equivalents of $LiNR_2$, $NaNR_2$, or $KNR_2$, where X is halogen.

In some aspects, a molecular precursor compound can be made by Reaction Scheme 11

REACTION SCHEME 11:

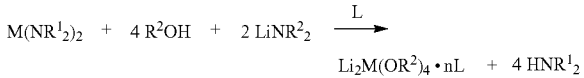

where M is Fe, n is from 0 to 8, $R^1$ is alkyl, aryl, heteroaryl, alkenyl, or silyl, and the —$OR^2$ groups can be independently selected, for each occurrence, from alkoxy, aryloxy, heteroaryloxy, alkenyloxy, siloxy, phosphinate, phosphonate, and phosphate.

In Reaction Scheme 11, $M(NR^1{}_2)_2$ is reacted with an alcohol and $LiOR^2$ to provide a molecular precursor.

In some embodiments, $M(NR^1{}_2)_2$ is reacted with an alcohol and a lithium amine to provide a molecular precursor.

In some embodiments, $R^2OH$ is $HOSi(OR^3)_3$, $HOSi(OR^3)_2R^4$, $HOSi(OR^3)R^4{}_2$, or $HOSiR^4{}_3$, wherein $R^3$ and $R^4$ are independently selected from alkyl, aryl, heteroaryl, or alkenyl.

In some embodiments, $LiOR^2$ is $LiOSi(OR^4)_3$, wherein $R^4$ is alkyl, aryl, heteroaryl, or alkenyl.

In some embodiments, $R^2OH$ is $HOP(O)(OR^5)_2$, or $HOP(O)(OR^5)R^5$, or $HOP(O)R^5{}_2$, wherein $R^5$ is alkyl, aryl, heteroaryl, or alkenyl.

Acetate Ink Compositions

Embodiments of this disclosure provide solid precursor compounds or mixtures of compounds that have surprisingly high solubility in an ink composition. Ink compositions of this disclosure may therefore provide a high throughput process for depositing cathode precursors for making cathode materials.

The precursor compounds or mixtures of compounds that are solubilized in an ink composition of this disclosure may be selected to have the stoichiometry of a desired cathode material.

In some embodiments, precursor compounds or mixtures of compounds can be solubilized in an ink composition by mixing the precursor compounds or mixtures of compounds with one or more organic solvents.

In certain aspects, this disclosure provides precursor compounds or mixtures of compounds that are surprisingly soluble in the presence of an acetate ink component.

Examples of an acetate ink component of this invention include alkyl acetates, ethyl acetate, propyl acetate, butyl acetate, n-butyl acetate, sec-butyl acetate, tert-butyl acetate, octyl acetates, aryl acetates, alkenyl acetates, and heteroaryl acetates.

Examples of an acetate ink component of this invention include methyl acetate, ethyl acetate, n-propyl acetate, n-butyl acetate, n-pentyl acetate, n-hexyl acetate, n-heptyl acetate, n-octyl acetate, n-nonyl acetate, n-decyl acetate, n-undecyl acetate, n-dodecyl acetate, n-tridecyl acetate, n-tetradecyl acetate, n-pentadecyl acetate, n-hexadecyl acetate, n-heptadecyl acetate, and n-octadecyl acetate.

Examples of an acetate ink component of this invention include isopropyl acetate, sec-butyl acetate, isobutyl acetate, tert-butyl acetate, isopentyl acetate, 2-methylbutyl acetate, 3-methylbutyl acetate, 2,2-dimethylbutyl acetate, 2,3-dimethylbutyl acetate, 2-methylpentyl acetate, 3-methylpentyl acetate, 4-methylpentyl acetate, 2-methylhexyl acetate, 3-methylhexyl acetate, 4-methylhexyl acetate, 5-methylhexyl acetate, 2,3-dimethylbutyl acetate, 2,3-dimethylpentyl acetate, 2,4-dimethylpentyl acetate, 2,2-dimethylhexyl acetate, 2,3-dimethylhexyl acetate, 2,4-dimethylhexyl acetate, 2,5-dimethylhexyl acetate, 2,2-dimethylpentyl acetate, 3,3-dimethylpentyl acetate, 3,3-dimethylhexyl acetate, 4,4-dimethylhexyl acetate, 2-ethylpentyl acetate, 3-ethylpentyl acetate, 2-ethylhexyl acetate, 3-ethylhexyl acetate, 4-ethylhexyl acetate, 2-methyl-2-ethylpentyl acetate, 2-methyl-3-ethylpentyl acetate, 2-methyl-4-ethylpentyl acetate, 2-methyl-2-ethylhexyl acetate, 2-methyl-3-ethylhexyl acetate, 2-methyl-4-ethylhexyl acetate, 2,2-diethylpentyl acetate, 3,3-diethylhexyl acetate, 2,2-diethylhexyl acetate, and 3,3-diethylhexyl acetate.

In some embodiments, an ink composition may be formed by dissolving precursor compounds or mixtures of compounds in a solvent or solvent mixture containing an acetate component.

The concentration of an acetate component in an ink composition of this disclosure may be from 0.01% to 100% (v/v), or from 1% to 99% (v/v), or from 1% to 50% (v/v).

In certain embodiments, an ink composition may be formed by dissolving precursor compounds or mixtures of compounds in an acetate component.

In further aspects, an ink composition can be made by directly forming precursor compounds or mixtures of compounds in a solvent containing an acetate component, or in a two-component acetate-solvent mixture.

This invention can provide an ink composition in which cathode precursor compounds or mixtures of compounds are surprisingly soluble and can be used in a high throughput process to make cathodes for lithium ion batteries.

Ink Compositions

Embodiments of this invention further provide ink compositions which contain one or more molecular precursor compounds. The molecular precursors of this invention may be used to make cathodes by printing an ink containing one or more molecular precursors onto a substrate.

In some embodiments, an ink can be made by mixing a molecular precursor with one or more solvents.

In some variations, the ink is a solution of the molecular precursors in an organic solvent. The solvent can include one or more organic liquids or solvents, and may contain an aqueous component. A solvent may be an organic solvent.

In certain embodiments, an ink may be a suspension or slurry of one or more molecular precursors in an organic solvent.

An ink can be made by providing one or more molecular precursor compounds and solubilizing, dissolving, solvating, or dispersing the compounds with one or more solvents. The compounds dispersed in a solvent may be nanocrystalline, nanoparticles, microparticles, amorphous, or dissolved molecules.

The concentration of the molecular precursors in an ink of this disclosure can be from about 0.01% to about 50% (w/w), or from about 0.1% to about 40%, or from about 0.1% to about 25%, or from about 1% to about 25%, or from about 5% to about 25%.

The concentration of the molecular precursors in an ink of this disclosure can be from about 1% to about 99% (w/w), or from about 50% to about 99%, or from about 50% to about 75%.

A molecular precursor may exist in a liquid or flowable phase under the temperature and conditions used for deposition, coating or printing.

In some variations of this invention, molecular precursors that are partially soluble, or are insoluble in a particular solvent can be dispersed in the solvent by high shear mixing.

As used herein, the term dispersing encompasses the terms solubilizing, dissolving, and solvating.

The solvent for an ink of this disclosure may be an organic liquid or solvent. Examples of a solvent for an ink of this disclosure include one or more organic solvents, which may contain an aqueous component.

Embodiments of this invention further provide molecular precursor compounds having enhanced solubility in one or more solvents for preparing inks. The solubility of a molecular precursor compound can be selected by variation of the nature and molecular size and weight of one or more organic coordinating species attached to the compound.

An ink composition of this invention may contain any of the dopants disclosed herein, or a dopant known in the art.

Ink compositions of this disclosure can be made by methods known in the art, as well as methods disclosed herein.

Examples of a solvent for an ink of this disclosure include alcohol, methanol, ethanol, isopropyl alcohol, sec-butanol, thiols, butanol, butanediol, glycerols, alkoxyalcohols, glycols, 1-methoxy-2-propanol, acetone, ethylene glycol, propylene glycol, propylene glycol laurate, ethylene glycol ethers, diethylene glycol, triethylene glycol monobutylether, propylene glycol monomethylether, 1,2-hexanediol, ethers, diethyl ether, aliphatic hydrocarbons, aromatic hydrocarbons, dodecane, hexadecane, pentane, hexane, heptane, octane, isooctane, decane, cyclohexane, p-xylene, m-xylene, o-xylene, benzene, toluene, xylene, tetrahydrofuran, 2-methyltetrahydrofuran, siloxanes, cyclosiloxanes, silicone fluids, halogenated hydrocarbons, dibromomethane, dichloromethane, dichloroethane, trichloroethane chloroform, methylene chloride, acetonitrile, esters, acetates, ethyl acetate, butyl acetate, acrylates, isobornyl acrylate, 1,6-hexanediol diacrylate, polyethylene glycol diacrylate, ketones, acetone, methyl ethyl ketone, cyclohexanone, butyl carbitol, cyclopentanone, lactams, N-methylpyrrolidone, N-(2-hydroxyethyl)-pyrrolidone, cyclic acetals, cyclic ketals, aldehydes, amines, diamines, amides, dimethylformamide, methyl lactate, oils, natural oils, terpenes, and mixtures thereof.

An ink of this disclosure may further include polyvinylidene fluoride.

An ink of this disclosure may further include components such as a surfactant, a dispersant, an emulsifier, an anti-foaming agent, a thickener, a viscosity modifier, a flow agent, a plasticizer, an extender, a film conditioner, and an adhesion promoter. Each of these components may be used in an ink of this disclosure at a level of from about 0.001% to about 10% or more of the ink composition.

Examples of surfactants include siloxanes, polyalkyleneoxide siloxanes, polyalkyleneoxide polydimethylsiloxanes, polyester polydimethylsiloxanes, ethoxylated nonylphenols, nonylphenoxy polyethyleneoxyethanol, fluorocarbon esters, fluoroaliphatic molecular esters, fluorinated esters, alkylphenoxy alkyleneoxides, cetyl trimethyl ammonium chloride, carboxymethylamylose, ethoxylated acetylene glycols, betaines, N-n-dodecyl-N,N-dimethylbetaine, dialkyl sulfosuccinate salts, alkylnaphthalenesulfonate salts, fatty acid salts, polyoxyethylene alkylethers, polyoxyethylene alkylallylethers, polyoxyethylene-polyoxypropylene block copolymers, alkylamine salts, quaternary ammonium salts, and mixtures thereof.

Examples of surfactants include anionic, cationic, amphoteric, and nonionic surfactants.

A surfactant may be used in an ink of this disclosure at a level of from about 0.001% to about 2% of the ink composition.

Examples of a dispersant include a polymer dispersant, a surfactant, hydrophilic-hydrophobic block copolymers, acrylic block copolymers, acrylate block copolymers, graft polymers, and mixtures thereof.

Examples of an emulsifier include a fatty acid derivative, an ethylene stearamide, an oxidized polyethylene wax, mineral oils, a polyoxyethylene alkyl phenol ether, a polyoxyethylene glycol ether block copolymer, a polyoxyethylene sorbitan fatty acid ester, a sorbitan, an alkyl siloxane polyether polymer, polyoxyethylene monostearates, polyoxyethylene monolaurates, polyoxyethylene monooleates, and mixtures thereof.

Examples of an anti-foaming agent include polysiloxanes, dimethylpolysiloxanes, dimethyl siloxanes, silicones, polyethers, octyl alcohol, organic esters, ethyleneoxide propyleneoxide copolymers, and mixtures thereof.

Examples of thickeners and viscosity modifiers include celluloses, urethanes, polyurethanes, styrene maleic anhydride copolymers, polyacrylates, polycarboxylic acids, carboxymethylcelluoses, hydroxyethylcelluloses, methylcelluloses, methyl hydroxyethyl celluloses, methyl hydroxypropyl celluloses, silicas, gellants, aluminates, titanates, gums, clays, waxes, polysaccharides, starches, and mixtures thereof.

Examples of flow agents include waxes, celluloses, butyrates, surfactants, polyacrylates, and silicones.

Examples of a plasticizer include alkyl benzyl phthalates, butyl benzyl phthalates, dioctyl phthalates, diethyl phthalates, dimethyl phthalates, di-2-ethylhexy-adipates, diisobutyl phthalates, diisobutyl adipates, dicyclohexyl phthalates, glycerol tribenzoates, sucrose benzoates, polypropylene glycol dibenzoates, neopentyl glycol dibenzoates, dimethyl isophthalates, dibutyl phthalates, dibutyl sebacates, tri-n-hexyltrimellitates, and mixtures thereof.

In certain variations, an ink may contain a chelator, or a viscosity modifier.

In certain aspects, an ink of this disclosure may be formed as a solution, a suspension, a slurry, or a semisolid gel or paste. An ink may include one or more molecular precursors solubilized in a solvent or solvent mixture, or in a solvent containing an acetate component. An ink may include one or more molecular precursors dissolved in a solvent or solvent mixture, or in a solvent containing an acetate component, so that the ink is a solution of the molecular precursors.

In certain variations, a molecular precursor may include particles or nanoparticles that can be suspended in a solvent or solvent mixture, or in a solvent containing an acetate component, and may be a suspension or paint of the molecular precursors. In certain embodiments, a molecular precursor can be mixed with a minimal amount of a solvent or solvent mixture, or a solvent containing an acetate component, and may be a slurry or semisolid gel or paste of the molecular precursor.

The viscosity of an ink of this disclosure can be from about 0.5 centipoises (cP) to about 50 cP, or from about 0.6 to about 30 cP, or from about 1 to about 15 cP, or from about 2 to about 12 cP.

The viscosity of an ink of this disclosure can be from about 20 cP to about $2 \times 10^6$ cP, or greater. The viscosity of an ink of this disclosure can be from about 20 cP to about $1 \times 10^6$ cP, or from about 200 cP to about 200,000 cP, or from about 200 cP to about 100,000 cP, or from about 200 cP to about 40,000 cP, or from about 200 cP to about 20,000 cP.

The viscosity of an ink of this disclosure can be about 1 cP, or about 2 cP, or about 5 cP, or about 20 cP, or about 100 cP, or about 500 cP, or about 1,000 cP, or about 5,000 cP, or about 10,000 cP, or about 20,000 cP, or about 30,000 cP, or about 40,000 cP.

In some embodiments, an ink may contain one or more components from the group of a surfactant, a dispersant, an emulsifier, an anti-foaming agent, a thickener, a viscosity modifier, a flow agent, a plasticizer, an extender, a film conditioner, and an adhesion promoter.

An ink may be made by dispersing one or more molecular precursor compounds of this disclosure in one or more solvents to form a dispersion or solution.

Molecular precursor inks may be used to form cathode layers by using multiple inks with different compositions. The use of multiple inks allows a wide range of compositions to be manufactured in a controlled fashion. In some embodiments, a two ink system is used.

Dopants

In some embodiments, the use of a molecular precursor compound can include a dopant.

In some embodiments, dopants may be used in solid form along with molecular precursor compounds in solid form.

In certain embodiments, dopants may be used in solution along with molecular precursor compounds in solution.

In further embodiments, dopants may be used in an ink composition along with molecular precursor compounds.

A dopant may be also introduced into a molecular precursor compound form during the synthesis of the precursor.

A cathode material of this disclosure made from a molecular precursor compound may contain atoms of one or more dopants.

The quantity of a dopant in an embodiment of this disclosure can be from about $1\times10^{-7}$ atom percent to about 5 atom percent relative to the most abundant metal atom, or greater. In some embodiments, a dopant can be included at a level of from about $1\times10^{16}$ cm$^{-3}$ to about $1\times10^{21}$ cm$^{-3}$. A dopant can be included at a level of from about 1 ppm to about 10,000 ppm.

In some embodiments, a dopant may include oxides of Mg, Y, Ti, Zr, Nb, Cr, Ru, B, Al, Bi, Sb, Sn, La, and mixtures of any of the foregoing.

Dopant species can be provided from dopant source compounds $Mg(OR)_2$, $Ti(OR)_4$, $Zr(OR)_4$, $Nb(OR)_3$, $Nb(OR)_5$, $Cr(OR)_3$, $Ru(OR)_3$, $B(OR)_3$, $Al(OR)_3$, $Sn(OR)_2$, $Sn(OR)_4$, $La(OR)_3$, and mixtures of any of the foregoing, where the —OR groups are independently selected from alkoxy, aryloxy, heteroaryloxy, alkenyloxy, siloxy, phosphinate, phosphonate, and phosphate groups.

Any of the foregoing dopants may be used with molecular precursor compounds in bulk solid form, or in solution, to form cathode materials.

Any of the foregoing dopant source compounds may be used in an ink or ink composition of this invention. A dopant may be introduced into a thin film by any of the deposition methods described herein.

Processes Using Bulk Cathode Materials

The molecular precursor compounds of this invention can be used to make bulk cathode materials by processes of this disclosure and according to methods known in the art.

Bulk cathode materials can be used directly to make batteries.

In some embodiments, a slurry of bulk cathode material can be made from molecular precursor compounds of this invention. The slurry may contain bulk cathode material, N-Methyl-2-pyrrolidone (NMP) at 0.4 to 0.6 g/g solids, polyvinylidene fluoride (PVDF) at 1-5%, and conductive carbon at 1-5%. The slurry can be deposited on an aluminum substrate by various methods including knife coating and rod coating, and dried, heated and/or pressed as required for ultimate use in battery production.

Examples of methods for depositing a slurry onto a surface or substrate include coating, dip coating, wet coating, spin coating, knife coating, roller coating, rod coating, slot die coating, meyerbar coating, lip direct coating, capillary coating, liquid deposition, layer-by-layer deposition, spin casting.

In some embodiments, a process for knife gap or die coating can be performed. The gap can be from 1 to 1000 nm, or larger, or from 10 to 1000 nm, or from 20 to 1000 nm, or from 50 to 500 nm, or from 100 to 400 nm. The coating speed can be from about 5 to 100 mm/s.

In some embodiments, a process for knife gap or die coating can be performed with a thickness per pass of from 1 to 1000 micrometers, or from 1 to 500 micrometers, or from 1 to 200 micrometers, or from 1 to 100 micrometers, or from 10 to 100 micrometers.

Processes for Thin Film Cathodes

The molecular precursor compounds of this invention can be used to make cathodes by depositing a layer onto a substrate, where the layer contains one or more molecular precursors. The deposited layer may be a film or a thin film.

As used herein, the terms "deposit," "depositing," and "deposition" refer to any method for placing a compound or composition onto a surface or substrate, including spraying, coating, and printing.

As used herein, the term "thin film" refers to a layer of atoms or molecules, or a composition layer on a substrate having a thickness of less than 1000 micrometers.

Inks and ink compositions containing molecular precursor compounds of this invention can be deposited onto a substrate using methods disclosed herein, as well as methods known in the art.

Examples of methods for depositing onto a surface or substrate include all forms of printing, spraying, and coating.

Cathode layers can be made by depositing one or more molecular precursors of this disclosure on a substrate or flexible substrate in a high throughput roll process. The depositing of molecular precursors in a high throughput roll process can be done by printing, spraying or coating a composition containing one or more molecular precursors of this disclosure.

In some aspects, the thickness of a cathode layer may be from about 0.01 to about 100 micrometers, or from about 0.01 to about 20 micrometers, or from about 0.01 to about 10 micrometers, or from about 0.05 to about 5 micrometers, or from about 0.1 to about 4 micrometers, or from about 0.1 to about 3.5 micrometers, or from about 0.1 to about 3 micrometers, or from about 0.1 to about 2.5 micrometers.

In some embodiments, the thickness of a cathode layer may be from about 1 to about 10 micrometers, or from about 1 to about 100 micrometers, or from about 1 to about 1000 micrometers, or from about 1 to about 500 micrometers, or from about 50 to about 100 micrometers, or from about 50 to about 500 micrometers, or from about 50 to about 1000 micrometers.

In some aspects, a layered substrate can be made by depositing a layer of a molecular precursor compound onto the substrate. The layer of the molecular precursor compound can be a single thin layer of the compound, or a plurality of layers of the compound.

A process to make a layered substrate can have a step of depositing a single precursor layer of a single molecular precursor on a substrate. The precursor layer can optionally be composed of a plurality of layers of the molecular precursor compound, or of different molecular precursor compounds. Each of the plurality of layers can be heated to form a thin film material layer before the deposition of the next layer of the molecular precursor compound.

The depositing of compounds by inkjet printing can be done at rates from about 10 nm to 3 micrometers per minute, or from 100 nm to 2 micrometers per minute.

The depositing of compounds by spraying can be done at rates from about 10 nm to 3 micrometers per minute, or from 100 nm to 2 micrometers per minute.

Examples of methods for printing using an ink of this disclosure include printing, gravure printing, reverse gravure printing, offset gravure printing, reverse offset gravure printing, three dimensional printing, inkjet printing, aerosol jet printing, ink printing, jet printing, screen printing, stamp/pad printing, transfer printing, pad printing, flexographic printing, contact printing, reverse printing, thermal printing, lithography, electrophotographic printing, and combinations thereof.

Examples of methods for depositing a molecular precursor onto a surface or substrate include electrodepositing, electroplating, electroless plating, bath deposition, coating, dip coating, wet coating, spin coating, knife coating, roller coating, rod coating, slot die coating, meyerbar coating, lip direct coating, capillary coating, liquid deposition, solution deposition, layer-by-layer deposition, spin casting, and solution casting.

Examples of methods for depositing molecular precursor compounds include spraying, spray coating, spray deposition, and spray pyrolysis.

The molecular precursors of this invention, and ink compositions containing molecular precursors, can be deposited onto a substrate using methods known in the art, as well as methods disclosed herein.

In some embodiments, a process for knife gap or die coating can be performed. The gap can be from 1 to 1000 µm, or larger, or from 10 to 1000 µm, or from 20 to 1000 µm, or from 50 to 500 µm, or from 100 to 400 µm. The coating speed can be from about 5 to 100 mm/s.

In some embodiments, a process for knife gap or die coating can be performed with a thickness per pass of from 10 to 10,000 nanometers, or from 20 to 10,000 nanometers, or from 100 to 10,000 nanometers, or from 100 to 5000 nanometers, or from 100 to 3000 nanometers, or from 100 to 1000 nanometers.

In certain embodiments, a first molecular precursor may be deposited onto a substrate, and subsequently a second molecular precursor may be deposited onto the substrate. In certain embodiments, several different molecular precursors may be deposited onto the substrate to create a layer.

In certain variations, different molecular precursors may be deposited onto a substrate simultaneously, or sequentially, whether by spraying, coating, printing, or by other methods. The different molecular precursors may be contacted or mixed before the depositing step, during the depositing step, or after the depositing step. The molecular precursors can be contacted before, during, or after the step of transporting the molecular precursors to the substrate surface.

The depositing of molecular precursors, including by spraying, coating, and printing, can be done in a controlled or inert atmosphere, such as in dry nitrogen and other inert gas atmospheres, as well as in a partial vacuum atmosphere.

Processes for depositing, printing, spraying, or coating molecular precursors can be done at various temperatures including from about 0° C. to about 100° C., or from about 20° C. to about 70° C.

Transforming Cathode Films or Images

Processes for making a cathode can include a step of transforming or converting a molecular precursor compound into a material.

The step of converting a molecular precursor compound into a material can be performed by thermal treatment. In some embodiments, a molecular precursor compound can be converted by the application of heat, light, kinetic, mechanical or other energy, or for example, UV light or microwave irradiation.

The step of converting a molecular precursor compound into a material can be performed at various temperatures including from about 100° C. to about 800° C., or from about 150° C. to about 800° C., or from about 200° C. to about 800° C., or from about 300° C. to about 800° C., or from about 400° C. to about 800° C., or from about 400° C. to about 700° C., or from about 400° C. to about 600° C., or from about 450° C. to about 650° C., or from about 450° C. to about 600° C., or from about 550° C. to about 650° C.

The step of converting a molecular precursor compound into a material can be performed at various temperatures including from about 50° C. to about 800° C., or from about 50° C. to about 700° C., or from about 50° C. to about 600° C., or from about 100° C. to about 600° C., or from about 150° C. to about 600° C., or from about 200° C. to about 500° C., or from about 200° C. to about 400° C.

In some embodiments, a step of converting a molecular precursor compound into a material, whether performed with neat solids or in solution, can be done with exposure to ambient air, or dry air, or air with controlled humidity.

In some embodiments, a step of converting a molecular precursor compound into a material, whether performed with neat solids or in solution, can be done in an inert atmosphere.

In certain embodiments, a step of converting a molecular precursor compound into a material, whether performed with neat solids or in solution, can be done in an inert atmosphere after exposure of the molecular precursor compound to ambient air, or dry air, or air with controlled humidity.

In certain aspects, a step of converting a molecular precursor compound into a material, whether performed with neat solids or in solution, can be done under oxidizing conditions or with exposure to an oxidizing atmosphere. Examples of an oxidizing atmosphere include 1% $O_2$/99% $N_2$, 10% $O_2$/90% $N_2$, and air.

In certain aspects, a step of converting a mixture of molecular precursor compounds into a material, whether performed with neat solids or in solution, can be done under reducing conditions. Examples of a reducing atmosphere include 1% $H_2$/99% $N_2$, and 5% $H_2$/95% $N_2$.

In certain aspects, depositing of molecular precursors on a substrate can be done while the substrate is heated. In these variations, a cathode material may be deposited or formed directly on the substrate.

In some variations, a substrate can be cooled after a step of heating. In certain embodiments, a substrate can be cooled before, during, or after a step of depositing a molecular precursor or ink thereof.

The step of converting a molecular precursor compound into a material can be performed in an inert atmosphere by heating to temperatures below about 400° C., or below about 300° C., or below about 200° C., or below about 150° C.

Embodiments of this disclosure further contemplate articles made by depositing a layer or image onto a substrate, where the layer or image contains one or more molecular precursor compounds. The article may be a substrate having a layer of a film, or a thin film, or an image which is deposited, sprayed, coated, or printed onto the substrate. In certain variations, an article may have a substrate printed with a molecular precursor ink, where the ink is printed in an image pattern on the substrate.

After conversion of a molecular precursor compound in a layer or image on a substrate into a material, another layer or image of the same or different molecular precursor may be applied to the material on the substrate by repeating the deposition procedure. This process can be repeated to prepare additional material layers, or a thicker layer of material on the substrate.

Processes for making a cathode can include a step of transforming a molecular precursor compound into a material. The material can be transformed into a final product cathode material.

The step of converting a material or pre-cathode material into a cathode material can be performed by thermal treatment. In some embodiments, a material or pre-cathode material can be transformed into a final cathode material by annealing.

Optionally, any step of converting or annealing a molecular precursor compound, layer, or image on a substrate can be performed under oxidizing conditions so that the molecular precursor compound is transformed to a final cathode film or material.

An annealing process may include a step of heating a substrate at a temperature sufficient to transform a material on the substrate into a final cathode film or material.

An annealing process may include a step of heating a substrate at a temperature of from 400° C. to 800° C. for a time period of from 1 min to 60 min. In some embodiments, an annealing process includes a step of heating a substrate at a temperature of 400° C., or 450° C., or 500° C., or 600° C., or 650° C.

An annealing process may include a step of rapid thermal processing.

Each step of heating can transform any and all layers present on the substrate into a material layer.

Embodiments of this invention further provide methods and compositions for introducing lithium ions at a controlled concentration into various layers and compositions of a battery. Lithium ions can be provided in various layers and the amount of lithium ions can be precisely controlled.

Devices

The molecular precursor compounds of this invention can be used to make cathode materials for lithium ion batteries.

For example, the molecular precursor compounds of this invention can be used to make cathode materials for lithium ion batteries such as CR2032 coin cell batteries, as well as pouch cell batteries.

In some embodiments, a thin film lithium ion battery device can be made from a cathode layer on a substrate by carrying out various finishing steps. Finishing steps may include use of a solid or liquid electrolyte, a separator or separator materials, an anode, and packaging.

Substrates

In general, a cathode will have an adjacent current collector. A substrate may have an electrical contact layer or current collector layer on its surface. An electrical contact layer on a substrate can be a current collector for a battery or storage device.

In some embodiments, a substrate may have an adhesion layer. An adhesion layer can be made from titanium, nickel, or chromium.

Examples of an electrical contact layer include a layer of a metal or a metal foil, as well as a layer of aluminum, copper, gold, platinum, silver, stainless steel, a metal alloy, and a combination of any of the foregoing.

Examples of substrates on which a molecular precursor of this disclosure can be deposited or printed include insulators, glass, silicon, mica, ceramics, flexible ceramics, and combinations thereof.

Examples of substrates on which a molecular precursor of this disclosure can be deposited or printed include metals, metal foils, aluminum, beryllium, chromium, copper, gallium, gold, lead, manganese, nickel, palladium, platinum, rhenium, rhodium, molybdenum, silver, stainless steel, steel, iron, strontium, tin, titanium, titanium nitride, tungsten, zinc, zirconium, metal alloys, metal silicides, metal carbides, and combinations thereof.

Examples of substrates on which a molecular precursor of this disclosure can be deposited or printed include the following materials on which a conductive layer has been placed: polymers, plastics, conductive polymers, copolymers, polymer blends, polyethylene terephthalates, polycarbonates, polyesters, polyester films, mylars, polyvinyl fluorides, polyvinylidene fluoride, polyethylenes, polyetherimides, polyethersulfones, polyetherketones, polyimides, polyvinylchlorides, acrylonitrile butadiene styrene polymers, silicones, epoxys, and combinations thereof.

A substrate may be layered with an adhesion promoter before the deposition, coating or printing of a layer of a molecular precursor of this invention.

Examples of adhesion promoters include a glass layer, a metal layer, a titanium-containing layer, a tungsten-containing layer, a tantalum-containing layer, tungsten nitride, tantalum nitride, titanium nitride, titanium nitride silicide, tantalum nitride silicide, a chromium-containing layer, a vanadium-containing layer, a nitride layer, an oxide layer, a carbide layer, and combinations thereof.

Substrates may be layered with a barrier layer before the deposition of printing of a layer of a molecular precursor of this invention.

Examples of a barrier layer include a glass layer, a metal layer, a titanium-containing layer, a tungsten-containing layer, a tantalum-containing layer, tungsten nitride, tantalum nitride, titanium nitride, titanium nitride silicide, tantalum nitride silicide, and combinations thereof.

A substrate can be of any thickness, and can be from about 20 micrometers to about 20,000 micrometers or more in thickness.

Target Cathode Materials

A number of target cathode materials are disclosed herein having a range of compositions. Methods and embodiments of this disclosure can provide a wide range of target cathode materials having controlled stoichiometry of transition metal atoms.

A target cathode material may be a lithium iron oxide, $LiFeO_2$.

A target cathode material may be a lithium iron oxide, $Li_{(1+x)}FeO_{(2+x/2)}$, where x is from 0 to 1. A target cathode material of this kind may have x from 0.01 to 1, or from 0.01 to 0.9, or from 0.01 to 0.8, or from 0.01 to 0.7, or from 0.01 to 0.6, or from 0.01 to 0.5, or from 0.01 to 0.4, or from 0.01 to 0.3, or from 0.01 to 0.2, or from 0.01 to 0.1, or from 0.01 to 0.05. A target cathode material of this kind may have x equal to 0.01, or 0.05, or 0.1, or 0.2, or 0.3, or 0.4, or 0.5, or 0.6, or 0.7, or 0.8, or 0.9.

Examples of a target cathode material include $Li_{1.1}FeO_{2.05}$, $Li_{1.2}FeO_{2.01}$, $Li_{1.3}FeO_{2.15}$, $Li_{1.4}FeO_{2.2}$, $Li_{1.5}FeO_{2.25}$, $Li_{1.6}FeO_{2.3}$, $Li_{1.7}FeO_{2.35}$, $Li_{1.8}FeO_{2.4}$, $Li_{1.9}FeO_{2.45}$, and $Li_2FeO_{2.5}$.

A target cathode material may be a lithium iron phosphate, $LiFePO_4$.

A target cathode material may be a lithium iron phosphate, $Li_{(1+x)}Fe(PO_{(4+x/2)})$, where x is from 0 to 1. A target cathode material of this kind may have x from 0.01 to 1, or from 0.01 to 0.9, or from 0.01 to 0.8, or from 0.01 to 0.7, or from 0.01 to 0.6, or from 0.01 to 0.5, or from 0.01 to 0.4, or from 0.01 to 0.3, or from 0.01 to 0.2, or from 0.01 to 0.1, or from 0.01 to 0.05. A target cathode material of this kind may have x equal to 0.01, or 0.05, or 0.1, or 0.2, or 0.3, or 0.4, or 0.5, or 0.6, or 0.7, or 0.8, or 0.9.

Examples of a target cathode material include $Li_{1.1}Fe(PO_{4.05})$, $Li_{1.2}Fe(PO_{4.1})$, $Li_{1.3}Fe(PO_{4.15})$, $Li_{1.4}Fe(PO_{4.2})$, $Li_{1.5}Fe(PO_{4.25})$, $Li_{1.6}Fe(PO_{4.3})$, $Li_{1.7}Fe(PO_{4.35})$, $Li_{1.8}Fe(PO_{4.4})$, $Li_{1.9}Fe(PO_{4.45})$, and $Li_2Fe(PO_{4.5})$.

A target cathode material may be a lithium iron silicate, $Li_2FeSiO_4$.

A target cathode material may be a lithium iron silicate, $Li_{(2+x)}Fe(SiO_{(4+x/2)})$, where x is from 0 to 1. A target cathode material of this kind may have x from 0.01 to 1, or from 0.01 to 0.9, or from 0.01 to 0.8, or from 0.01 to 0.7, or from 0.01 to 0.6, or from 0.01 to 0.5, or from 0.01 to 0.4, or from 0.01 to 0.3, or from 0.01 to 0.2, or from 0.01 to 0.1, or from 0.01 to 0.05. A target cathode material of this kind may have x equal to 0.01, or 0.05, or 0.1, or 0.2, or 0.3, or 0.4, or 0.5, or 0.6, or 0.7, or 0.8, or 0.9.

Examples of a target cathode material include $Li_{2.1}Fe(SiO_{4.05})$, $Li_{2.2}Fe(SiO_{4.1})$, $Li_{2.3}Fe(SiO_{4.15})$, $Li_{2.4}Fe(SiO_{4.2})$, $Li_{2.5}Fe(SiO_{4.25})$, $Li_{2.6}Fe(SiO_{4.3})$, $Li_{2.7}Fe(SiO_{4.35})$, $Li_{2.8}Fe(SiO_{4.4})$, $Li_{2.9}Fe(SiO_{4.45})$, and $Li_3Fe(SiO_{4.5})$.

CHEMICAL DEFINITIONS

As used herein, the term transition metal refers to atoms of Groups 3 though 12 of the Periodic Table of the elements recommended by the Commission on the Nomenclature of Inorganic Chemistry and published in *IUPAC Nomenclature of Inorganic Chemistry, Recommendations* 2005.

As used herein, the term atom percent, atom %, or at % refers to the amount of an atom with respect to the final material in which the atoms are incorporated. For example, "0.5 at % X in a material" refers to an amount of X atoms equivalent to 0.5 atom percent of the atoms in the material.

As used herein, the term (X,Y) when referring to compounds or atoms indicates that either X or Y, or a combination thereof may be found in the formula. For example, (Ni, Co) indicates that atoms of either Ni or Co, or any combination thereof may be found. Further, using this notation the amount of each atom can be specified, for example, (0.75 Ni, 0.25 Co)

The term "alkyl" as used herein refers to a hydrocarbyl radical of a saturated aliphatic group, which can be a branched or unbranched, substituted or unsubstituted aliphatic group containing from 1 to 22 carbon atoms. This definition applies to the alkyl portion of other groups such as, for example, cycloalkyl, alkoxy, alkanoyl, aralkyl, and other groups defined below. The term "cycloalkyl" as used herein refers to a saturated, substituted or unsubstituted cyclic alkyl ring containing from 3 to 12 carbon atoms. As used herein, the term "C(1-5)alkyl" includes C(1)alkyl, C(2)alkyl, C(3)alkyl, C(4)alkyl, and C(5)alkyl. Likewise, the term "C(3-22)alkyl" includes C(1)alkyl, C(2)alkyl, C(3)alkyl, C(4)alkyl, C(5)alkyl, C(6)alkyl, C(7)alkyl, C(8)alkyl, C(9)alkyl, C(10)alkyl, C(11)alkyl, C(12)alkyl, C(13)alkyl, C(14)alkyl, C(15)alkyl, C(16)alkyl, C(17)alkyl, C(18)alkyl, C(19)alkyl, C(20)alkyl, C(21)alkyl, and C(22)alkyl.

As used herein, an alkyl group may be designated by a term such as Me (methyl), Et (ethyl), Pr (any propyl group), $^n$Pr (n-Pr, n-propyl), $^i$Pr (i-Pr, isopropyl), Bu (any butyl group), $^n$Bu (n-Bu, n-butyl), $^i$Bu (i-Bu, isobutyl), $^s$Bu (s-Bu, sec-butyl), and $^t$Bu (t-Bu, tert-butyl).

The term "alkoxy" as used herein refers to an alkyl, cycloalkyl, alkenyl, or alkynyl group covalently bonded to an oxygen atom. The term "alkanoyl" as used herein refers to —C(=O)-alkyl, which may alternatively be referred to as "acyl." The term "alkanoyloxy" as used herein refers to —O—C(=O)-alkyl groups. The term "alkylamino" as used herein refers to the group —NRR', where R and R' are each either hydrogen or alkyl, and at least one of R and R' is alkyl. Alkylamino includes groups such as piperidino wherein R and R' form a ring. The term "alkylaminoalkyl" refers to -alkyl-NRR'.

The term "aryl" as used herein refers to any stable monocyclic, bicyclic, or polycyclic carbon ring system of from 4 to 12 atoms in each ring, wherein at least one ring is aromatic. Some examples of an aryl include phenyl, naphthyl, tetrahydro-naphthyl, indanyl, and biphenyl. Where an aryl substituent is bicyclic and one ring is non-aromatic, it is understood that attachment is to the aromatic ring. An aryl may be substituted or unsubstituted.

The term "substituted" as used herein refers to an atom having one or more substitutions or substituents which can be the same or different and may include a hydrogen substituent. Thus, the terms alkyl, cycloalkyl, alkenyl, alkynyl, alkoxy, alkanoyl, alkanoyloxy, alkylamino, alkylaminoalkyl, aryl, heteroaryl, heterocycle, aroyl, and aralkyl as used herein refer to groups which include substituted variations. Substituted variations include linear, branched, and cyclic variations, and groups having a substituent or substituents replacing one or more hydrogens attached to any carbon atom of the group. Substituents that may be attached to a carbon atom of the group include alkyl, cycloalkyl, alkenyl, alkynyl, alkoxy, alkanoyl, alkanoyloxy, alkylamino, alkylaminoalkyl, aryl, heteroaryl, heterocycle, aroyl, aralkyl, acyl, hydroxyl, cyano, halo, haloalkyl, amino, aminoacyl, alkylaminoacyl, acyloxy, aryloxy, aryloxyalkyl, mercapto, nitro, carbamyl, carbamoyl, and heterocycle. In general, a substituent may itself be further substituted with any atom or group of atoms.

Some examples of a substituent for a substituted alkyl include halogen, hydroxyl, carbonyl, carboxyl, ester, aldehyde, carboxylate, formyl, ketone, thiocarbonyl, thioester, thioacetate, thioformate, selenocarbonyl, selenoester, selenoacetate, selenoformate, alkoxyl, phosphoryl, phosphonate, amino, amido, amidine, imino, cyano, nitro, azido, carbamato, sulfhydryl, alkylthio, sulfate, sulfonate, sulfamoyl, sulfonamido, sulfonyl, silyl, heterocyclyl, aryl, aralkyl, aromatic, and heteroaryl.

It will be understood that "substitution" or "substituted with" refers to such substitution that is in accordance with permitted valence of the substituted atom and the substituent. As used herein, the term "substituted" includes all permissible substituents.

This invention encompasses any and all tautomeric, solvated or unsolvated, hydrated or unhydrated forms, as well as any atom isotope forms of the compounds and compositions disclosed herein.

This invention encompasses any and all crystalline polymorphs or different crystalline forms of the compounds and compositions disclosed herein.

Additional Embodiments

All publications, references, patents, patent publications and patent applications cited herein are each hereby specifically incorporated by reference in their entirety for all purposes.

While this invention has been described in relation to certain embodiments, aspects, or variations, and many details have been set forth for purposes of illustration, it will be apparent to those skilled in the art that this invention includes additional embodiments, aspects, or variations, and that some of the details described herein may be varied considerably without departing from this invention. This invention includes such additional embodiments, aspects, and variations, and any modifications and equivalents thereof. In particular, this invention includes any combination of the features, terms, or elements of the various illustrative components and examples.

The use herein of the terms "a," "an," "the" and similar terms in describing the invention, and in the claims, are to be construed to include both the singular and the plural.

The terms "comprising," "having," "include," "including" and "containing" are to be construed as open-ended terms which mean, for example, "including, but not limited to." Thus, terms such as "comprising," "having," "include," "including" and "containing" are to be construed as being inclusive, not exclusive.

Recitation of a range of values herein refers individually to each and any separate value falling within the range as if it were individually recited herein, whether or not some of the values within the range are expressly recited. For example, the range "4 to 12" includes without limitation any whole, integer, fractional, or rational value greater than or equal to 4 and less than or equal to 12, as would be understood by those skilled in the art. Specific values employed herein will be understood as exemplary and not to limit the scope of the invention.

Recitation of a range of a number of atoms herein refers individually to each and any separate value falling within the range as if it were individually recited herein, whether or not some of the values within the range are expressly recited. For example, the term "C1-8" includes without limitation the species C1, C2, C3, C4, C5, C6, C7, and C8.

Definitions of technical terms provided herein should be construed to include without recitation those meanings associated with these terms known to those skilled in the art, and are not intended to limit the scope of the invention. Definitions of technical terms provided herein shall be construed to dominate over alternative definitions in the art or definitions which become incorporated herein by reference to the extent that the alternative definitions conflict with the definition provided herein.

The examples given herein, and the exemplary language used herein are solely for the purpose of illustration, and are not intended to limit the scope of the invention. All examples and lists of examples are understood to be non-limiting.

When a list of examples is given, such as a list of compounds, molecules or compositions suitable for this invention, it will be apparent to those skilled in the art that mixtures of the listed compounds, molecules or compositions may also be suitable.

EXAMPLES

Example 1

Cathode Molecular Precursor Compound LiFe(O$^s$Bu)$_3$

A cathode molecular precursor compound represented by the formula LiFe(O$^s$Bu)$_3$ was synthesized using the following procedure.

To an orange solution of LiN(SiMe$_3$)$_2$ (0.20 g, 1.2 mmol) and Fe[N(SiMe$_3$)$_2$]$_2$·THF (0.55 g, 1.2 mmol) in 30 mL THF was added $^s$BuOH (0.40 mL, 4.4 mmol) using a syringe under inert atmosphere (Schlenk line). The reaction mixture rapidly changed to a green color and was allowed to stir at 25° C. for 12 h, followed by filtration and removal of the volatile species (solvent and HN(SiMe$_3$)$_2$) under dynamic vacuum. 0.22 g of product (66%) was recovered as a pale green solid.

Elemental analysis by ICP: Li to Fe ratio, 1.10:1.00.

Example 2

Cathode Molecular Precursor Compound LiFe(O$^s$Bu)$_4$

A cathode molecular precursor compound represented by the formula LiFe(O$^s$Bu)$_4$ was synthesized using the following procedure.

To a red/brown solution of LiN(SiMe$_3$)$_2$ (0.14 g, 0.8 mmol) and Fe[N(SiMe$_3$)$_2$]$_3$ (0.44 g, 0.8 mmol) in 40 mL THF was added $^s$BuOH (0.32 mL, 3.5 mmol) using a syringe under inert atmosphere (Schlenk line). The reaction mixture rapidly changed to a green/brown color and was stirred at 25° C. for 12 h, followed by filtration and removal of volatile species (solvent and HN(SiMe$_3$)$_2$) under dynamic vacuum. 0.17 g of product (48%) was recovered as a green/brown solid.

Elemental analysis by ICP: Li to Fe ratio, 0.91:1.00.

Example 3

Cathode Molecular Precursor Compound LiFe[OP(O)(O$^t$Bu)$_2$]$_3$

A cathode molecular precursor compound represented by the formula LiFe[OP(O)(O$^t$Bu)$_2$]$_3$ was synthesized using the following procedure.

To an orange solution of LiN(SiMe$_3$)$_2$ (0.07 g, 0.4 mmol) and Fe[N(SiMe$_3$)$_2$]$_2$·THF (0.19 g, 0.4 mmol) in 30 mL THF was added ($^t$BuO)$_2$P(O)OH (0.26 g, 1.2 mmol) at −35° C. under inert atmosphere in a glovebox. The reaction mixture rapidly changed color to brown and was allowed to stir at 25° C. for 12 h, followed by filtration and removal of the volatile species (solvent and HN(SiMe$_3$)$_2$) under dynamic vacuum. 0.11 g of product (40%) was recovered as a brown solid.

Elemental analysis by ICP: Li to Fe to P ratio, 1.04:1.00:3.19.

Example 4

Cathode Molecular Precursor Compound Li$_2$Fe(O$^s$Bu)$_4$

A cathode molecular precursor compound represented by the formula Li$_2$Fe(O$^s$Bu)$_4$ was synthesized using the following procedure.

To an orange solution of LiN(SiMe$_3$)$_2$ (0.79 g, 4.7 mmol) and Fe[N(SiMe$_3$)$_2$]$_2$ THF (1.06 g, 2.4 mmol) in 30 mL THF was added $^s$BuOH (1.0 mL, 11 mmol) via syringe under inert atmosphere (Schlenk line). The reaction mixture rapidly changed color to green and was stirred at 25° C. for 12 h, followed by filtration and removal of the volatiles under reduced pressure. 0.69 g of product (79%) was recovered as a pale green solid.

Example 5

Cathode Molecular Precursor Compound Li$_2$Fe[OSi(O$^t$Bu)$_3$](O$^s$Bu)$_3$

A cathode molecular precursor compound represented by the formula Li$_2$Fe[OSi(O$^t$Bu)$_3$](O$^s$Bu)$_3$ was synthesized using the following procedure.

To an orange/brown solution of LiN(SiMe$_3$)$_2$ (0.36 g, 2.2 mmol), Fe[N(SiMe$_3$)$_2$]$_2$·THF (0.48 g, 1.1 mmol) and ($^t$BuO)$_3$SiOH (0.28 g, 1.1 mmol) in 40 mL THF was added $^s$BuOH (0.30 mL, 3.3 mmol) using a syringe under inert atmosphere (Schlenk line). The reaction mixture rapidly changed color to green and was allowed to stir at 25° C. for 12 h, followed by filtration and removal of the volatile species (solvent and HN(SiMe$_3$)$_2$) under dynamic vacuum. 0.397 g of product (62%) was recovered as a green/brown solid.

Elemental analysis by ICP: Li to Fe ratio, 2.03:1.00.

Example 6

Cathode Molecular Precursor Compound Li$_2$Fe[OSi(O$^t$Bu)$_3$](O$^s$Bu)$_4$

A cathode molecular precursor compound represented by the formula Li$_2$Fe[OSi(O$^t$Bu)$_3$](O$^s$Bu)$_4$ was synthesized using the following procedure.

To a red/brown solution of LiN(SiMe$_3$)$_2$ (0.33 g, 2.0 mmol), Fe[N(SiMe$_3$)$_2$]$_3$ (0.53 g, 1.0 mmol) and ($^t$BuO)$_3$SiOH (0.26 g, 1.0 mmol) in 40 mL THF was added $^s$BuOH (0.36 mL, 4.0 mmol) using a syringe under inert atmosphere (Schlenk line). The reaction mixture rapidly changed color to green/brown and was allowed to stir at 25° C. for 12 h, followed by filtration and removal of the volatile species (solvent and HN(SiMe$_3$)$_2$) under dynamic vacuum. 0.376 g of product (63%) was isolated as a green/brown solid.

Example 7

Bulk Cathode Material from Molecular Precursor Compound LiFe(O$^s$Bu)$_3$

The molecular precursor compound LiFe(O$^s$Bu)$_3$ was converted into bulk cathode material lithium iron oxide. 0.10 g of LiFe(O$^s$Bu)$_3$ was converted into bulk material by heating at 300° C. in a tube furnace in air for 10 minutes. A ceramic yield of 34.6% was observed, compared to the theoretical yield of 33.6% for LiFeO$_2$.

Elemental analysis by ICP: The Li/Fe ratio was found to be 0.96:1.00.

Example 8

Bulk Cathode Material from Molecular Precursor Compound Li$_2$Fe(O$^s$Bu)$_4$

The molecular precursor compound Li$_2$Fe(O$^s$Bu)$_4$ was converted into bulk cathode material lithium iron oxide. 0.10 g of Li$_2$Fe(O$^s$Bu)$_4$ was converted into bulk material by heating at 300° C. in a tube furnace in air for 10 minutes. A ceramic yield of 34.8% was observed, compared to the theoretical yield of 30.0% for Li$_2$FeO$_{2.5}$.

Example 9

Bulk Cathode Material from Iron Phosphate Molecular Precursor Compound

The molecular precursor compound Li$_2$Fe(O$^s$Bu)$_4$ was converted into bulk cathode material lithium iron oxide. A solid mixture of LiFe[OP(O)(O$^t$Bu)$_2$]$_3$ (0.0623 g, 0.09 mmol) and LiFe(O$^s$Bu)$_3$ (0.0509 g, 0.18 mmol) was ground to a fine powder (mortar and pestle) and heated at 300° C. for 10 minutes in air. A ceramic yield of 40.7% was observed, compared to the theoretical yield of 37.7% for Li$_2$FeO$_{2.5}$.

Example 10

Inks of Lithium-Iron Molecular Precursor Compounds

Cathode precursor inks are made according to the following procedures.

(a) An ink is prepared by dissolving 0.15 g of the cathode precursor compound LiFe(O$^s$Bu)$_3$ in n-butyl acetate to a concentration of 5 wt %. The resulting ink is filtered through a 0.2 μm syringe filter prior to use.

(b) An ink is prepared by dissolving 0.15 g of the cathode precursor compound LiFe(O$^s$Bu)$_4$ in n-butyl acetate to a concentration of 10 wt %. The resulting ink is filtered through a 0.2 μm syringe filter prior to use.

(c) An ink is prepared by dissolving 1.0 g of the cathode precursor compound LiFe(O$^s$Bu)$_3$ in n-butyl acetate to a concentration of 10 wt %. The resulting ink is filtered through a 0.2 μm syringe filter prior to use.

(d) An ink is prepared by dissolving 0.33 g of the cathode precursor compound LiFe[OP(O)(O$^t$Bu)$_2$]$_3$ in n-butyl acetate to a concentration of 15 wt %. The resulting ink is filtered through a 0.2 μm syringe filter prior to use.

(e) An ink is prepared by dissolving 0.15 g of the cathode precursor compound Li$_2$Fe[OSi(O$^t$Bu)$_3$](O$^s$Bu)$_3$ in n-butyl acetate to a concentration of 20 wt %. The resulting ink is filtered through a 0.2 μm syringe filter prior to use.

(f) An ink is prepared by dissolving 0.15 g of the cathode precursor compound Li$_2$Fe[OSi(O$^t$Bu)$_3$](O$^s$Bu)$_4$ in ethyl acetate to a concentration of 10 wt %. The resulting ink is filtered through a 0.2 μm syringe filter prior to use.

(g) An ink is prepared by dissolving 0.15 g of the cathode precursor compound LiFe[OP(O)(O$^t$Bu)$_2$]$_3$ with two equivalents of LiFe(O$^s$Bu)$_3$ in n-butyl acetate to a concentration of 10 wt %. The resulting ink is filtered through a 0.2 μm syringe filter prior to use.

Example 11

Cathode Precursor Ink of Iron Molecular Precursor Compound (a) An ink solution of LiFe(O$^s$Bu)$_3$ was prepared by dissolving 0.30 g of the molecule in 2.70 g of n-butyl acetate at room temperature to 10 wt % molecule.

(b) An ink solution of Li$_2$Fe(O$^s$Bu)$_4$ was prepared by dissolving 0.30 g of the molecule in 2.70 g of 2-methyl tetrahydrofuran at room temperature to 10 wt % molecule.

Example 12

Cathode Precursor Inks of Iron Molecular Precursor Compounds with Binary Solvent Systems Cathode precursor inks are made according to the following procedures using binary or two-solvent systems. The resulting ink may be filtered through a 0.2 μm syringe filter prior to use.

An ink is prepared by adding 0.08 g of n-butyl acetate to a mixture of 0.15 g of the cathode precursor compound LiFe(O$^s$Bu)$_3$ and 2-methyl-tetrahydrofuran. The ink has a concentration of 10 wt % of the cathode precursor compound.

An ink is prepared by adding 0.15 g of the cathode precursor compound LiFe(O$^s$Bu)$_4$ to a 50:50 butyl acetate/N-methylpyrrolidone mixture to a concentration of 10 wt % of the cathode precursor compound.

An ink is prepared by adding 0.15 g of the cathode precursor compound LiFe[OP(O)(O$^t$Bu)$_2$]$_3$ to a 50:50 butyl acetate/2-methyl-tetrahydrofuran mixture to a concentration of 10 wt % of the cathode precursor compound.

An ink is prepared by adding 0.09 g of the cathode precursor compound LiFe(O$^s$Bu)$_3$ to a 50:50 butyl acetate/dodecane mixture to a concentration of 10 wt % of the cathode precursor compound.

An ink is prepared by adding 0.18 g of n-butyl acetate to a mixture of 0.11 g of the cathode precursor compound Li$_2$Fe[OSi(O$^t$Bu)$_3$](O$^t$Bu)$_3$ and 1.72 g cyclohexane. The ink has a concentration of 5.5 wt % of the cathode precursor compound.

An ink is prepared by adding 0.1 g of the cathode precursor compound Li$_2$Fe[OSi(O$^t$Bu)$_3$](O$^t$Bu)$_4$ to 0.2 g n-butyl acetate to which 1.7 g of heptane is added, giving a concentration of 5 wt % of the cathode precursor compound.

Example 13

Inkjet Printing of Cathode Iron Molecular Precursor Compound Inks

Cathode precursor inks are prepared by dissolving 0.15 g of the cathode precursor compound LiFe(O$^s$Bu)$_3$ in n-butyl acetate to a concentration of 5 wt %, 10 wt %, 15 wt % and 20 wt % of the cathode precursor compound.

The cathode precursor inks are printed onto a current collector coated substrate by inkjet printing with a Fujifilm Dimatix DMP-2831 inkjet printer. Films having a thickness from 1 to 2 micrometers are made.

Example 14

Coating with Iron Molecular Precursor Compound Inks

An ink containing 50 mol % LiFe(O$^s$Bu)$_3$ and 50 mol % Li$_2$Fe(O$^s$Bu)$_4$ was prepared by mixing 0.282 g of solution "5" and 0.362 g of solution "6". The final cathode material target for this ink was Li$_{1.5}$FeO$_{2.25}$. The ink was spin coated (SCS Spincoat G3P-8) onto a 50×50×0.7 mm glass substrate with a 1300 rpm spin rate and 40 s spin time under an inert atmosphere (glove box) and dried at 100° C. for 3 minutes leaving a molecular precursor film. The substrate was then heated in air at 300° C. for 5 minutes to form a Li$_{1.5}$FeO$_{2.25}$ cathode film with a thickness of about 120 nm.

Solution "5": A blue/green solution of LiFe(O$^s$Bu)$_3$ was prepared by dissolving 0.30 g of the molecule in 2.70 g of n-butyl acetate at room temperature (10 wt % molecule).

Solution "6": A green solution of Li$_2$Fe(O$^s$Bu)$_4$ was prepared by dissolving 0.30 g of the molecule in 2.70 g of 2-methyl tetrahydrofuran at room temperature (10 wt % molecule).

Example 15

Coating with Iron Molecular Precursor Compound Inks

An ink containing 80 mol % LiFe(O$^s$Bu)$_3$ and 20 mol % Li$_2$Fe(O$^s$Bu)$_4$ was prepared by mixing 0.451 g of solution "5" and 0.145 g of solution "6". The final cathode material target for this ink was Li$_{1.2}$FeO$_{2.1}$. The ink was spin coated (SCS Spincoat G3P-8) onto a 50×50×0.7 mm glass substrate with a 1300 rpm spin rate and 40 s spin time under an inert atmosphere (glove box) and dried at 100° C. for 3 minutes leaving a molecular precursor film. The substrate was then heated in air at 300° C. for 5 minutes to form a Li$_{1.2}$FeO$_{2.1}$ cathode film with a thickness of about 120 nm.

Example 16

Battery Assembly

A cathode was formed using bulk solid iron molecular precursor compounds.

0.0509 g of the iron molecular precursor compound LiFe(O$^s$Bu)$_3$ was mixed by grinding with 0.0623 g of the iron molecular precursor compound LiFe((OP(O)(O$^s$Bu)$_2$)$_3$. The mixture was heated at 300° C. for 10 min in air. The ceramic yield was 40.7%, compared to a theoretical yield for LiFePO$_4$ of 37.7%.

Battery:

The cathode is used in a half-cell along with liquid electrolyte LiPF$_6$ in carbonate solvent, and combined with a polymer separator and a lithium anode to form a lithium ion battery device.

What is claimed is:

1. A molecular precursor compound having the empirical formula

—[LiFe(OP(O)(O$^t$Bu)$_2$)$_3$)].

2. A process for making a cathode material, the process comprising:
   providing one or more molecular precursor compounds according to claim 1, or a mixture thereof; and
   heating the mixture at a temperature of from 100° C. to 800° C. to convert it to a material.

3. The process of claim 2, wherein the heating is performed with exposure to air or oxidizing atmosphere.

4. The process of claim of claim 2, wherein the heating is performed under inert atmosphere after exposure to air or oxidizing atmosphere.

5. The process of claim 2, wherein the mixture is a mixture of solids.

6. The process of claim 2, wherein the mixture is in a solution.

7. The process of claim 2, further comprising annealing the material at a temperature of from 400° C. to 800° C.

8. The process of claim 2, wherein the mixture contains one or more dopant source compounds having the formula M(OR)$_q$, where M is selected from Mg, Y, Ti, Zr, Nb, Ru, B, Al, Bi, Sb, Sn, La, q is the same as the oxidation state of the atom M, and (OR) is selected from alkoxy, aryloxy, heteroaryloxy, alkenyloxy, siloxy, phosphinate, phosphonate, and phosphate.

9. A cathode made by the process of claim 2.

10. A lithium ion battery made with the cathode of claim 9.

11. A process for making an ink, the process comprising:
    providing a molecular precursor compound according to claim 1; and
    dissolving the compound in an acetate-solvent mixture comprising an acetate ink component;
    wherein the acetate ink component is selected from alkyl acetates, ethyl acetate, propyl acetates, butyl acetates, n-butyl acetate, sec-butyl acetate, tert-butyl acetate, hexyl acetates, aryl acetates, alkenyl acetates, and heteroaryl acetates; and wherein the solvent is selected from alcohol, methanol, ethanol, isopropyl alcohol, sec-butanol, thiols, butanol, butanediol, glycerols, alkoxyalcohols, glycols, 1-methoxy-2-propanol, acetone, ethylene glycol, propylene glycol, propylene glycol laurate, ethylene glycol ethers, diethylene glycol, triethylene glycol monobutylether, propylene glycol monomethylether, 1,2-hexanediol, ethers, diethyl ether, aliphatic hydrocarbons, aromatic hydrocarbons, dodecane, hexadecane, pentane, hexane, heptane, octane, isooctane, decane, cyclohexane, p-xylene, m-xylene, o-xylene, benzene, toluene, xylene, tetrahydrofuran, 2-methyltetrahydrofuran, siloxanes, cyclosiloxanes, silicone fluids, halogenated hydrocarbons, dibromomethane, dichloromethane, dichloroethane, trichloroethane chloroform, methylene chloride, acetonitrile, esters, acrylates, isobornyl acrylate, 1,6-hexanediol diacrylate, polyethylene glycol diacrylate, ketones, methyl ethyl ketone, cyclohexanone, butyl carbitol, cyclopentanone, lactams, N-methyl pyrrolidone, N-(2-hydroxyethyl)-pyrrolidone, cyclic acetals, cyclic ketals, aldehydes, amines, diamines, amides, dimethylformamide, methyl lactate, oils, natural oils, terpenes, and mixtures thereof.

\* \* \* \* \*